US012568244B2

(12) United States Patent
Baijal et al.

(10) Patent No.: US 12,568,244 B2
(45) Date of Patent: Mar. 3, 2026

(54) METHOD AND DEVICE FOR IMPROVING VIDEO QUALITY

(71) Applicant: SAMSUNG ELECTRONICS CO., LTD., Suwon-si (KR)

(72) Inventors: Anant Baijal, Suwon-si (KR); Jayoon Koo, Suwon-si (KR); Cheulhee Hahm, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 116 days.

(21) Appl. No.: 18/113,748

(22) Filed: Feb. 24, 2023

(65) Prior Publication Data

US 2023/0209087 A1     Jun. 29, 2023

Related U.S. Application Data

(63) Continuation of application No. PCT/KR2021/010077, filed on Aug. 2, 2021.

(30) Foreign Application Priority Data

Aug. 25, 2020    (KR) ........................ 10-2020-0107410

(51) Int. Cl.
*H04N 19/587*      (2014.01)
*G06T 7/20*       (2017.01)
*G06V 10/70*      (2022.01)

(52) U.S. Cl.
CPC ............. *H04N 19/587* (2014.11); *G06T 7/20* (2013.01); *G06V 10/70* (2022.01)

(58) Field of Classification Search
CPC ......... H04N 19/587; G06T 7/20; G06V 10/70
See application file for complete search history.

(56) References Cited

U.S. PATENT DOCUMENTS 6,042,477 A * 3/2000 Addink ...................... G06F 1/14
                                                   713/375
8,355,442 B2   1/2013 Walls
            (Continued)

FOREIGN PATENT DOCUMENTS

JP      2019-176218 A   10/2019
KR     2002-0017576 A    3/2002
            (Continued)

OTHER PUBLICATIONS

Communication issued Dec. 20, 2023 by the European Patent Office in European Patent Application No. 21861910.4.
            (Continued)

*Primary Examiner* — Edemio Navas, Jr.
(74) *Attorney, Agent, or Firm* — Sughrue Mion, PLLC

(57) ABSTRACT

A method performed by at least one processor for improving video quality, includes: obtaining, from a first frame of a video comprising a plurality of pixels, first motion information regarding a user control object displayed in a display interface, the user control object comprising a first set of pixels included in the plurality of pixels; obtaining, from the first frame of the video by using a first neural network, second motion information from a second set of pixels included in the plurality of pixels, the second set of pixels excluding the first set of pixels; and generating, by using a second neural network with the first motion information and the second motion information as inputs for the second neural network, an interpolation frame between the first frame and a second frame included in the video.

20 Claims, 15 Drawing Sheets

810

(56) References Cited

U.S. PATENT DOCUMENTS

| | | | |
|---|---|---|---|
| 8,582,660 | B2 | 11/2013 | Mahadevan et al. |
| 9,473,758 | B1 | 10/2016 | Long et al. |
| 9,621,841 | B1 | 4/2017 | Hong et al. |
| 10,134,114 | B2 | 11/2018 | Adsumilli et al. |
| 10,412,409 | B2 | 9/2019 | Bae et al. |
| 11,127,208 | B2 | 9/2021 | Kim et al. |
| 2007/0071100 | A1 | 3/2007 | Shi et al. |
| 2013/0051471 | A1 | 2/2013 | Ahn et al. |
| 2014/0226901 | A1 | 8/2014 | Spracklen et al. |
| 2017/0155885 | A1 | 6/2017 | Selstad et al. |
| 2017/0270365 | A1* | 9/2017 | Laska ................. G06F 3/04842 |
| 2017/0337735 | A1* | 11/2017 | Goslin .................... G06T 19/20 |
| 2019/0066733 | A1 | 2/2019 | Somanath et al. |
| 2019/0130639 | A1* | 5/2019 | Boyce ..................... G06F 3/013 |
| 2019/0323852 | A1* | 10/2019 | Ondruska ............... G06F 17/18 |
| 2020/0160540 | A1 | 5/2020 | Rastgar |
| 2020/0364834 | A1* | 11/2020 | Ferrés ....................... G06T 5/60 |
| 2021/0142086 | A1* | 5/2021 | Berkovich .............. G06N 3/04 |
| 2021/0243361 | A1* | 8/2021 | Ebata ................... H04N 23/634 |
| 2021/0278539 | A1* | 9/2021 | Laddha ................. G01S 17/931 |
| 2022/0092795 | A1* | 3/2022 | Liu ....................... H04N 7/0127 |
| 2022/0284691 | A1* | 9/2022 | Chen ....................... G06V 10/54 |

FOREIGN PATENT DOCUMENTS

| | | | |
|---|---|---|---|
| KR | 10-2017-0080496 | A | 7/2017 |
| KR | 10-1756842 | B1 | 7/2017 |
| KR | 10-2018-0078431 | A | 7/2018 |
| KR | 10-2019-0077253 | A | 7/2019 |
| KR | 10-2020-0019855 | A | 2/2020 |
| KR | 10-2411911 | B1 | 6/2022 |

OTHER PUBLICATIONS

Communication dated Oct. 29, 2021, issued by the International Searching Authority in counterpart International Application No. PCT/KR2021/010077 (PCT/ISA/220, PCT/ISA/210, and PCT/ISA/237).

Communication issued Dec. 1, 2025 by the European Patent Office in European Patent Application No. 21861910.4.

* cited by examiner (b)

| PARAMETER VALUE | OBJECT 1 | OBJECT 2 |
|---|---|---|
| 1 | [V1, ⋯, ...] | [V1', ⋯, ...] |
| 2 | [V2, ⋯, ...] | [V2', ⋯, ...] |
| 3 | [V3, ⋯, ...] | [V3', ⋯, ...] |
| ⋮ | ⋮ | ⋮ |

METHOD AND DEVICE FOR IMPROVING VIDEO QUALITY

CROSS-REFERENCE TO RELATED APPLICATIONS

This application is a by-pass continuation application of International Application No. PCT/KR2021/010077, filed on Aug. 2, 2021, which claims priority to Korean Patent Application No. 10-2020-0107410, filed on Aug. 25, 2020 in the Korean Intellectual Property Office, the disclosures of which are incorporated by reference herein in their entireties.

BACKGROUND

1. Field

Various embodiments relate to a method and apparatus for improving video quality, and more particularly, to a method and apparatus for improving video quality, by increasing the number of frames included in the video.

2. Description of Related Art

Apparatuses for reproducing image data and the image data itself may be associated with a Frames per second (FPS). However, the FPS of the image data may differ from the FPS of an apparatus for reproducing the image data. For example, the FPS of an image display device that outputs the image data may be greater than the FPS of the image data. If this situation occurs, when received image data is transmitted as it is (e.g., no post processing), image quality deteriorates, and thus, the image display device is required to increase the FPS to improve the quality of the image.

To increase the FPS, the image display device may perform frame interpolation or frame synthesis. The frame interpolation or frame synthesis is a technology of reconstructing a damaged or missing frame, or generating a new frame between frames to smoothen an image.

An artificial intelligence (AI) system is a system in which a machine trains itself and makes decisions, and derives a target result or performs a target operation.

SUMMARY

According to an aspect of the disclosure, a method performed by an apparatus for improving video quality, includes: obtaining, from a first frame of a video including a plurality of pixels, first motion information regarding a user control object displayed in a display interface, the user control object including a first set of pixels included in the plurality of pixels; obtaining, from the first frame of the video by using a first neural network, second motion information from a second set of pixels included in the plurality of pixels, the second set of pixels excluding the first set of pixels; and generating, by using a second neural network, an interpolation frame between the first frame and a second frame included in the video, from the first frame, the second frame, the first motion information and the second motion information.

The method may further include post processing the first motion information and the second motion information, where the post processing includes at least one of: modifying motion information of a certain pixel included in the plurality of pixels by using motion information of at least one adjacent pixel adjacent to the certain pixel; or obtaining motion information per object by grouping the pixels included in the frame per object.

The method may further include: receiving a third frame before obtaining the first motion information; and generating a mapping table based on a user input regarding an object included in the third frame, where the obtaining the first motion information includes obtaining the first motion information from the mapping table.

The generating the mapping table may include: obtaining motion information regarding all pixels included in the third frame by using the first neural network; detecting at least one object from the third frame by using a third neural network; identifying the user control object controlled according to the user input from the detected at least one object; and generating the mapping table based on a correlation between motion information of the pixels included in the user control object and the user input.

The method may further include modifying motion information of pixels included in the detected at least one object, based on an event regarding the detected at least one object, wherein the event includes at least one of zoom-in, zoom-out, or rotation.

The detecting the at least one object may include detecting whether the at least one object is a foreground object or a background object.

The generating the mapping table may include: receiving the user input during a predetermined period of time; and updating the mapping table based on the user input during the predetermined period of time.

The generating of the mapping table may include: obtaining a parameter change value of a parameter of a controller according to the user input; and mapping the motion information of the pixels included in the user control object according to the parameter change value of the controller, where the parameter of the controller includes at least one of a moving direction, a moving distance, a moving time, a moving speed, a moving acceleration, a moving strength, or a moving amplitude.

The generating of the mapping table may include generating the mapping table for each type of the controller that receives the user input.

The method the obtaining of the first motion information may include obtaining the first motion information from metadata included in the video.

According to an aspect of the disclosure, an apparatus for improving video quality, includes: a memory storing one or more instructions; and a processor configured to execute the one or more instructions stored in the memory to: obtain, from a first frame of a video including a plurality of pixels, first motion information regarding a user control object displayed in a display interface, the user control object including a first set of pixels included in the plurality of pixels; obtain, from the first frame of the video by using a first neural network, second motion information from a second set of pixels included in the plurality of pixels, the second set of pixels excluding the first set of pixels; and generate, by using a second neural network, an interpolation frame between the first frame and a second frame included in the video, from the first frame, the second frame, the first motion information and the second motion information.

The processor may be further configured to execute the one or more instructions to post process the first motion information and the second motion information, where the post process includes at least one of modifying motion information of a certain pixel included in the plurality of pixels by using motion information of at least one adjacent pixel adjacent to the certain pixel, or obtaining motion information per object by grouping pixels included in the frame per object.

The processor may be further configured to execute the one or more instructions to: receive a third frame before obtaining the first motion information; and generate a mapping table based on a user input regarding an object included in the third frame; and obtaining the first motion information from the mapping table.

The processor may be further configured to execute the one or more instructions to: obtain motion information regarding all pixels included in the third frame by using the first neural network; detect at least one object from the third frame by using a third neural network; identify the user control object controlled according to a user input from the detected at least one object; and generate the mapping table based on a correlation between motion information of the pixels included in the user control object and the user input.

The processor may be further configured to execute the one or more instructions to: modify motion information of pixels included in the detected at least one object, based on an event regarding the detected at least one object, wherein the event comprises at least one of zoom-in, zoom-out, or rotation.

The processor may be further configured to execute the one or more instructions to: detect whether the at least one object is a foreground object or a background object.

The processor may be further configured to execute the one or more instructions to: receive the user input during a predetermined period of time, and update the mapping table based on the user input during the predetermined period of time.

The processor may be further configured to execute the one or more instructions to: obtain a parameter change value of a parameter of a controller according to the user input and map the motion information of the pixels included in the user control object according to the parameter change value of the controller, wherein the parameter of the controller comprises at least one of a moving direction, a moving distance, a moving time, a moving speed, a moving acceleration, a moving strength, or a moving amplitude.

The processor may be further configured to execute the one or more instructions to: generate the mapping table for each type of the controller that receives the user input.

According to an aspect of the disclosure, a non-transitory computer-readable recording medium has instructions stored therein, which when executed by a processor cause the process to execute a method of improving video quality, the method including: obtaining, from a first frame of a video including a plurality of pixels, first motion information regarding a user control object displayed in a display interface, the user control object including a first set of pixels included in the plurality of pixels; obtaining, from the first frame of the video by using a first neural network, second motion information from a second set of pixels included in the plurality of pixels, the second set of pixels excluding the first set of pixels; and generating, by using a second neural network, an interpolation frame between the first frame and a second frame included in the video from the first frame, the second frame, the first motion information and the second motion information.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 illustrates a mapping table according to an embodiment;

DETAILED DESCRIPTION

Figure 1:
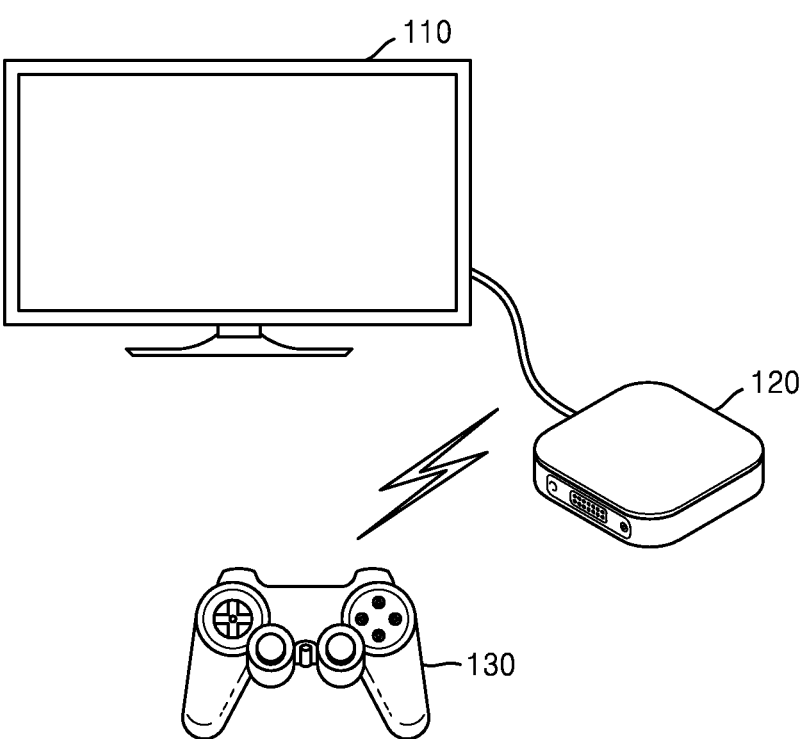
FIG. 1 is a diagram for describing a display device outputting a video image by improving the quality of the video image, according to an embodiment.

Embodiments of the disclosure will be described in detail with reference to the accompanying drawings such that one of ordinary skill in the art may easily implement the disclosure. However, the disclosure may be implemented in various different forms and is not limited to the embodiments of the disclosure described herein.

Terms used in the disclosure are described as general terms currently used in consideration of functions described in the disclosure, but the terms may have different meanings according to an intention of one of ordinary skill in the art, precedent cases, or the appearance of new technologies. Thus, the terms used herein should not be interpreted only by its name, but have to be defined based on the meaning of the terms together with the description throughout the specification.

Also, the terms used in the disclosure are only used to describe specific embodiments of the disclosure, and are not intended to limit the disclosure.

Throughout the specification, when a part is "connected" to another part, the part may not only be "directly connected" to the other part, but may also be "electrically connected" to the other part with another element in between.

"The" and similar directives used in the present specification, in particular, in claims, may indicate both singular and plural. Also, unless there is a clear description of an order of operations describing a method according to the disclosure, the operations described may be performed in a suitable order. The disclosure is not limited by the order of description of the described operations.

The phrases "some embodiments," "an embodiment," or "one or more embodiments" appearing in various places in this specification are not necessarily all referring to the same embodiment.

Some embodiments of the disclosure may be represented by functional block configurations and various processing operations. Some or all of these functional blocks may be implemented by various numbers of hardware and/or software configurations that perform particular functions. For example, the functional blocks of the disclosure may be implemented by one or more microprocessors or by circuit configurations for a certain function. Also, for example, the functional blocks of the disclosure may be implemented in various programming or scripting languages. The functional blocks may be implemented by algorithms executed in one or more processors. In addition, the disclosure may employ general techniques for electronic environment setting, signal processing, and/or data processing. Terms such as "mechanism", "element", "means", and "configuration" may be used widely and are not limited as mechanical and physical configurations.

In addition, a connection line or a connection member between components shown in drawings is merely a functional connection and/or a physical or circuit connection. In an actual device, connections between components may be represented by various functional connections, physical connections, or circuit connections that are replaceable or added.

In addition, terms such as "unit", "-or/-er", and "module" described in the specification denote a unit that processes at least one function or operation, which may be implemented in hardware or software, or implemented in a combination of hardware and software.

Also, in the specification, the term "user" denotes a person who controls a function or operation of a display device or an apparatus for improving video quality, by using the display device or the apparatus for improving video quality, and may include a consumer, an administrator, or an installation engineer.

Hereinafter, the disclosure will be described in detail with reference to accompanying drawings.

FIG. 1 is a diagram for describing a display device 110 outputting a video image by improving the quality of the video image, according to an embodiment.

Referring to FIG. 1, the display device 110 may be an electronic device configured to process and output an image. The display device 110 may be a fixed type or a mobile type, and may be realized as various types of electronic devices known to one of ordinary skill in the art including a display.

The display device 110 may include at least one of a game-exclusive monitor for outputting a game, a digital TV, a desktop computer, a smartphone, a tablet personal computer (PC), a mobile phone, a video phone, an e-book reader, a laptop PC, a netbook computer, a digital camera, a personal digital assistant (PDA), a portable multimedia player (PMP), a camcorder, a navigation device, a wearable device, a smart watch, a home network system, a security system, a medical device, or any other device known to one of ordinary skill in the art that outputs and displays image data.

The display device 110 may be implemented as not only a flat display device, but also a curved display device with a screen having a curvature or a flexible display device with an adjustable curvature. Output resolution of the display device 110 may include, for example, high definition (HD), full HD, ultra HD, a definition clearer than ultra HD, or any other resolution definition known to one of ordinary skill in the art.

The display device 110 may output a video. The video may include a plurality of frames. The video may include items of various movies or dramas provided through a television program or video-on-demand (VOD) service.

According to one or more embodiments, the video output by the display device 110 may include game data. The display device 110 may receive online game data in real time through the Internet or another network, and output the same. In one or more examples, the display device 110 may download a game application or a program, and output game data offline. In one or more examples, the display device 110 may be connected to a game device 120 separate from the display device 110, and receive game data stored in the game device 120 and output the same.

FIG. 1 illustrates a case where the game device 120 is connected to the display device 110, but this configuration is only an example, and embodiments of the disclosure are not limited thereto.

In FIG. 1, the game device 120 may be various types of electronic devices storing game data including video, audio, and subtitles. The game device 120 may be embodied in a form of a chip or a universal serial bus (USB), or in various electronic devices including a chip or USB therein.

The game device 120 may be connected to the display device 110 wirelessly or via wires to transmit the game data to the display device 110.

The display device 110 may receive the game data from the game device 120 and output the same. The game data output by the display device 110 may be controlled by a control device 130. The control device 130 may be realized as various types of devices known to one of ordinary skill in the art for controlling the game data output from the display device 110, such as a remote controller, a mobile phone, a joystick, a keyboard, or a mouse.

When a display of the display device 110 is realized as a touchscreen, the control device 130 may be replaced by a finger of a user or an input pen.

The control device 130 may include a key or button for controlling the game data output from the display device 110. For example, the control device 130 may include various keys for controlling motion of an object included in a video, such as a direction key or a rotation key, a zoom-in or zoom-out key for increasing or decreasing the size of an object, an enter key for selecting an item, and a key for returning to a previous screen or setting an environment.

The control device 130 may control the display device 110 by using wired communication, such as high-definition multimedia interface (HDMI) cable, or control the display device 110 by using short-range communication including infrared or Bluetooth communication. The control device 130 may control a function of the display device 110 by using at least one of a provided key (including a button), a touchpad, a microphone configured to receive a user's speech, or a sensor configured to recognize motion of the control device 130.

With the improvement in specifications based on the embodiments of the disclosure, the frames per second (FPS) supported by the display device 110 advantageously increases. These improvements result in an increase of a frame rate, and when the frame rate is increased, motion of an object included in a video becomes smoother. Therefore, the embodiments of the present disclosure result in improved image quality of displayed image data.

According to one or more embodiments, to increase the frame rate, the display device 110 may generate an interpolation frame by using two frames included in the video. For example, when the game data is manufactured in 30 FPS and the display device 110 reproducing the game data supports 60 FPS, the display device 110 may improve image quality of the video by adding one frame for each frame, so as to increase the FPS of the game data from 30 FPS to 60 FPS. The motion of the object in the game data is often very fast, and thus, when the frame rate is increased, the motion of the object becomes more natural, thereby increasing video quality.

To increase the FPS, the display device 110 may perform frame interpolation or frame synthesis. The frame interpolation or frame synthesis may also be known as frame rate conversion or FRC. In the descriptions below, the terms "frame interpolation" or "frame synthesis" may also be referred to as frame rate conversion or FRC.

According to one or more embodiments, the display device 110 may obtain motion information of a pixel included in an object of frame controlled by a user by using the control device 130. The display device may further obtain motion information of a pixel not included in the object, from among pixels included in a frame, by using different methods.

Hereinafter, for convenience of descriptions, an object that may be controlled by the user by using the control device 130 may be referred to as a user control object.

According to one or more embodiments, the display device 110 may obtain motion information regarding the user control object from a mapping table pre-generated and stored in the display device 110.

According to one or more embodiments, when the game data includes metadata including information about an object, the display device 110 may obtain the motion information regarding the user control object from the metadata.

Because the display device 110 obtains the motion information by using the metadata or mapping table pre-stored with respect to the user control object, motion of the user control object according to a user input may be advantageously estimated with higher accuracy.

According to one or more embodiments, the display device 110 may obtain, by using at least one neural network, motion information regarding a pixel other than a pixel included in the user control object, from among the pixels included in the frame. For example, the display device 110 obtains the motion information regarding only the pixel other than the user control object instead of all pixels included in the frame, and thus throughput required for data processing or complexity of the data processing may be decreased and a data processing speed may be increased.

According to one or more embodiments, the display device 110 may generate an interpolation frame located between at least two frames, by using the motion information obtained regarding the user control object, the motion information obtained regarding the pixel other than the user control object, and the at least two frames.

As such, according to one or more embodiments, the display device 110 may more quickly and accurately generate the interpolation frame by obtaining the pieces of motion information regarding the user control object and remaining pixels by using different methods and generating the interpolation frame by using the pieces of motion information.

Figure 2:
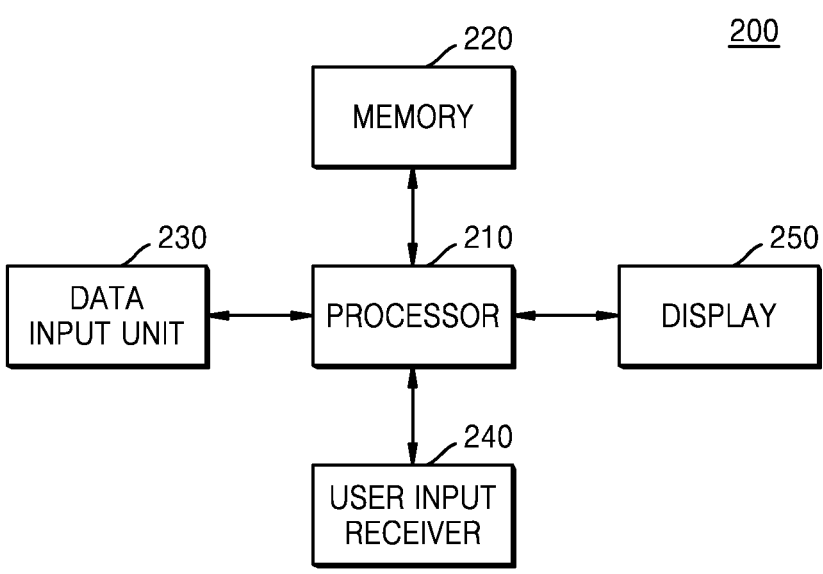
FIG. 2 is an internal block diagram of a display device according to an embodiment.

FIG. 2 is an internal block diagram of a display device 200 according to an embodiment.

Referring to FIG. 2, the display device 200 may include a processor 210, a memory 220, a data input unit 230, a user input receiver 240, and a display 250.

According to one or more embodiments, the display device 200 may be an electronic device that may output a frame of a video input through the data input unit 230, and generate an interpolation frame by obtaining motion information of a user control object among the output frame and motion information regarding remaining pixels by using one or more methods.

According to one or more embodiments, the display 250 may display various types of content on a screen. The display 250 may output, on the screen, game data that is received in real time or received through streaming or downloading.

According to one or more embodiments, the display 250 may output the game data on the screen and output an interface screen requesting a user input through the user input receiver 240 during a certain period of time. A user may adjust motion of the user control object by using the user input receiver 240 as indicated by the interface screen.

When the display 250 is configured as a touch screen, the display 250 may be used as an input device, such as a user interface, as well as an output device. For example, the display 250 may include at least one of a liquid crystal display, a thin-film transistor-liquid crystal display, an organic light-emitting diode, a flexible display, a 3-dimensional (3D) display, an electrophoretic display, or any other display structure known to one of ordinary skill in the art. According to one or more embodiments, the display device 200 may include two or more displays 250.

According to one or more embodiments of the disclosure, the memory 220 may store at least one instruction. The memory 220 may store at least one program executed by the processor 210. The memory 220 may store at least one neural network and/or a pre-defined operation rule or an artificial intelligence (AI) model. Furthermore, the memory 220 may store data input to or output from the display device 200.

According to one or more embodiments, the memory 220 may store a mapping table generated by the display device 200. In one or more examples, when the game data includes metadata, the memory 220 may store the metadata regarding the game data.

The memory 220 may include at least one type of storage medium among a flash memory type, a hard disk type, a multimedia card micro type, a card type memory (for example, a secure digital (SD) or an extreme digital (XD) memory), random access memory (RAM), static RAM (SRAM), read-only memory (ROM), electrically erasable programmable ROM (EEPROM), programmable ROM (PROM), a magnetic memory, a magnetic disk, an optical disk, or any other memory known to one of ordinary skill in the art.

The processor 220 may control overall operations of the display device 200. The processor 210 may execute the one or more instructions stored in the memory 220 to control the display device 200 to operate.

According to one or more embodiments, the display device 200 may use AI technology. AI technology may include machine learning (deep learning) and element technologies using machine learning. AI technology may be realized by using an algorithm. In one or more example, algorithm or a set of algorithms for realizing AI technology may be referred to as a neural network. The neural network may receive input data, perform operations for analysis and classification, and output result data. Training of the neural network enhances the neural network's ability to accurately output the result data corresponding to the input data. The training may indicate that various types of data are input to the neural network, where the neural network may be trained such that the neural network discovers or learns, by itself, a method of analyzing the input data, a method of classifying the input data, and/or a method of extracting a feature required to generate result data from the input data. The training of the neural network denotes that an AI model of a desired characteristic is prepared by applying a learning algorithm to a plurality of pieces of training data. Such training may be performed by the display device 200 using AI according to one or more embodiments, or a separate server/system.

The learning algorithm may be a method of training a certain target device (e.g., a display device, a robot, etc.) by using a plurality of pieces of training data such that the certain target device may make decisions by itself or perform prediction. Examples of the learning algorithm include supervised learning, unsupervised learning, semi-supervised learning, reinforcement learning, or any other learning algorithm known to one of ordinary skill in the art. The learning algorithm according to one or more embodiments is not limited thereto unless specified.

A set of algorithms for outputting output data corresponding to input data through the neural network, software for executing the set of algorithms, and/or hardware for executing the set of algorithms may be referred to as an AI model.

The processor 210 may process the input data according to a pre-defined operation rule or AI model. The pre-defined operation rule or AI model may be prepared by using a specific algorithm. Furthermore, the AI model may have learned the specific algorithm. The processor 210 may generate the output data corresponding to the input data through the AI model.

According to one or more embodiments, the processor 210 may store at least one AI model. According to one or more embodiments, the processor 210 may generate the output data from an input image by using a plurality of AI models. According to one or more embodiments, the memory 220, instead of the processor 210, may store the AI models.

According to one or more embodiments, the neural network used by the processor 210 may be a neural network trained to predict motion information regarding pixels included in a frame. For example, for an object included in a first frame, the neural network may predict the motion of the object in one or more subsequent frames.

According to one or more embodiments, the neural network used by the processor 210 may be a neural network trained to detect an object included in the frame. For example, the neural network may analyze information included in the frame to detect a location of the object in the frame.

According to one or more embodiments, the neural network used by the processor 210 may be a neural network trained to generate the interpolation frame by using the frames and the motion information.

According to one or more embodiments, the processor 210 may output the game data, receive a user input through the user input receiver 240 during a certain period of time, and identify the user control object among objects included in the frame, based on the user input.

The processor 210 may obtain correlation between the user input through the user input receiver 240 and the motion information of the user control object according to the user input, and generate the mapping table regarding the user control object based on the correlation.

Until the mapping table is generated, the processor 210 may predict the motion information by using at least one neural network regarding all pixels included in the frame. For example, before the mapping table is generated, the processor 210 may generate the interpolation frame between at least two frames by using the at least two frames and the motion information regarding all pixels included in the frame.

After the mapping table is generated, the processor 210 may obtain motion information by using one or more methods depending on whether an object included in the frame is a user control object or not.

According to one or more embodiments, the processor 210 may obtain, regarding the user control object, motion information corresponding to the user input from the pre-generated and stored mapping table.

According to one or more embodiments, the processor 210 may perform motion estimation by using at least one neural network only for pixels excluding pixels included in the user control object.

According to one or more embodiments, the processor 210 may generate the interpolation frame by using the motion information obtained regarding the user control object, the motion information obtained regarding the remaining pixels, and/or the plurality of frames included in the image data.

The data input unit 230 may be connected to an external device or server through a wired or wireless communication network, and receive the game data including video (e.g., a moving image signal or a still image signal), and audio (e.g., a speech signal or a music signal). In one or more examples, the game data may further include additional information such as metadata. The metadata may include motion information regarding an object included in the game data.

The user input receiver 240 may receive user control regarding the game data output by the display 250. The user input receiver 240 may receive, through the wired or wireless communication network, the user input through the control device 130, such as a remote controller, a mobile phone, a joystick, a keyboard, or a mouse.

According to one or more embodiments, the processor 210 may control the above-disclosed operations to be performed by executing one or more instructions stored in the memory 220. The memory 220 may store the one or more instructions executable by the processor 210.

According to one or more embodiments, the processor 210 may store the one or more instructions in a memory provided inside the processor 210, and control the above operations to be performed by executing the one or more instructions stored in the memory provided therein. For example, the processor 210 may perform a certain operation by executing a program or at least one instruction stored in the memory 220 or in the memory provided inside the processor 210.

According to one or more embodiments, the processor 210 that performs a function of improving video quality by generating the interpolation frame may be mounted on the display device 200 by being manufactured in a form of at least one hardware chip, or included in the display device 200 in a form of a chip or electronic device. In one or more videos, the processor 210 that performs the function of improving video quality may be embodied as a software module in the display device 200.

Figure 3:
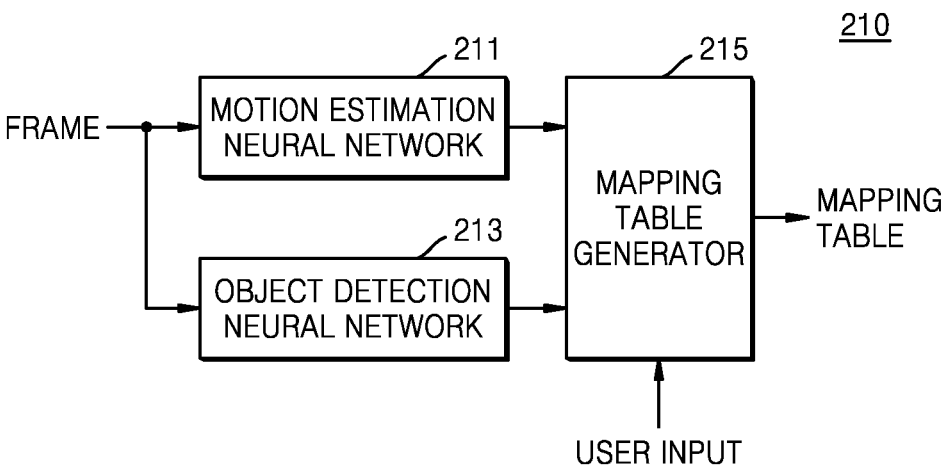
FIG. 3 is a block diagram for describing a processor included in a display device generating a mapping table, according to an embodiment.

FIG. 3 is a block diagram for describing a processor included in a display device generating a mapping table, according to an embodiment.

Referring to FIG. 3, the processor 210 may include a motion estimation neural network 211, an object detection neural network 213, and a mapping table generator 215.

The motion estimation neural network 211 may be a neural network trained to obtain motion information from input data.

The motion information may include a motion vector. According to one or more embodiments, the motion information may also be referred to as an optical flow. The optical flow may be data containing information about motion of an object, and a motion amount may be calculated by optically recognizing a flow of an object. The optical flow may be obtained by calculating the motion of image intensities. For example, the optical flow may be a motion pattern of the object between consecutive frames, which may be generated by relative motion of the object or camera.

The motion estimation neural network 211 may be an algorithm obtaining motion information per pixel from the input data, a set of algorithms, software executing the set of algorithms, and/or hardware executing the set of algorithms.

According to one or more embodiments, the motion estimation neural network 211 may obtain motion estimation per pixel, based on at least two frames (e.g., a first frame and a second frame). Here, the first frame may be a previous image and the second frame may be a current image. The motion estimation may provide an estimate of motion of an object in the first and second frames.

The motion estimation neural network 211 may be a convolutional neural network (CNN)-based neural network, such as a CNN, deep convolutional neural network (DCNN), or a CapsNet neural network. When a correlation between pieces of information included in an image is local, the CNN-based neural network may introduce a filter considering only a specific region, and generate a new feature map by performing convolution on pieces of information in the filter.

The motion estimation neural network 211 may be a DCNN having a plurality of depths. For example, the motion estimation neural network 211 may include a plurality of internal layers performing operations. When a depth of the neural network performing an operation increases, such a neural network may be classified as a deep neural network (DNN). An operation of the DNN may include CNN operation or the like.

The motion estimation neural network 211 may include a plurality of layers from a low level layer to a high level layer. Each layer includes a plurality of weight values, and may perform an operation through operations of the plurality of weight values and an operation result of a previous layer.

A pooling layer may be arranged behind a convolution layer. The convolution layer may be a layer of pieces of data generated according to a convolution operation, and the pooling layer may be a layer for reducing the number of pieces of data or the size of data through subsampling or pooling. Through the convolution layer and the pooling layer, pieces of data, for example, feature maps, indicating features of an input frame may be generated.

Depths of the convolution layer and pooling layer may vary. Furthermore, different pieces of feature data may be extracted according to the depths of the convolution layer and pooling layer. For example, when the depths of the convolution layer and pooling layer deepen, pieces of information indicating the features of the input frame may have more detailed forms. The depth and form may be variously designed considering accuracy of a result, reliability of a result, and an operation processing speed and capacity of a processor.

The motion estimation neural network 211 may extract a feature map from each layer for each of the at least two input frames. Here, when a depth of a layer filter changes, an output feature map may also change. The motion estimation neural network 211 may predict motion estimation by using the feature map extracted for each layer.

When game data starts to be output, the motion estimation neural network 211 may predict motion estimation regarding all pixels of the input frame until a mapping table is generated.

The object detection neural network 213 may be a neural network trained to detect an object by analyzing and classifying the input data. The object detection neural network 213 may be an algorithm detecting an object from input data, a set of algorithms, software executing the set of algorithms, and/or hardware executing the set of algorithms.

The object detection neural network 213 may be a DNN performing operations through a plurality of hidden layers.

Examples of the neural network includes a convolutional neural network (CNN), a deep neural network (DNN), a recurrent neural network (RNN), a restricted Boltzmann machine (RBM), a deep belief network (DBN), a bidirectional recurrent deep neural network (BRDNN), a deep Q-network, or any other suitable neural network known to one of ordinary skill in the art. The object detection neural network 213 according to one or more embodiments is not limited thereto unless specified. Furthermore, the CNN may be subdivided into a deep convolutional neural network (DCNN) or a CapsNet neural network.

According to one or more embodiments, the object detection neural network 213 may be realized by using various segmentation algorithms. A technology for segmenting an object from a frame may include pixel-based, edge-based, and region-based methods, but is not limited thereto.

The object detection neural network 213 may detect at least one object from the input frame. The object detection neural network 213 may separate and detect the object from the frame between the object included in the frame and remaining regions, based on colors, saturation, brightness, contrast, or any other suitable image features known to one of ordinary skill in the art.

The mapping table generator 215 may obtain motion estimation per pixel from the motion estimation neural network 211, and obtain information regarding the object from the object detection neural network 213.

The mapping table generator 215 may receive a user input through the user input receiver 240, and identify, from among objects, a user control object controlled according to the user input.

The user input may include a parameter value of the control device 130. In detail, when a user controls the control device 130, the parameter value of the control device 130 may change according to user control. The mapping table generator 215 may receive a parameter change value of the control device 130, and identify motion degrees of objects output on a screen when the parameter value of the control device 130 changes.

The mapping table generator 215 may identify, as the user control object, an object having the highest correlation between a change in the parameter value and the motion information. The mapping table generator 215 may include, in the mapping table, location information of the identified user control object, for example, a coordinate value of a boundary of pixel of the user control object, a pixel number, or any other suitable location information known to one of ordinary skill in the art.

The mapping table generator 215 may map the change in the parameter value of the control device 130 according to the user input with the motion degree of the user control object, and include the same in the mapping table. A parameter of the control device 130 may include at least one of a moving direction, a moving distance, a moving time, a moving speed, a moving acceleration, moving strength, or moving amplitude of the control device 130 according to the user input.

The parameter value of the control device 130 may change according to a type of the control device 130. For example, the parameter value may change for each control device when the control device 130 is a keyboard and when the control device 130 is a joystick. The mapping table generator 215 may generate the mapping table for each type of control device 130.

The mapping table generator 215 may continuously update the mapping table, based on the user input during a certain period of time. For example, the mapping table generator 215 may continuously detect an object having a highest motion degree, from a plurality objects, according to the user input, during the certain period of time or regarding a certain number of frames. Furthermore, the mapping table generator 215 may continuously perform a process of generating the mapping table by relating the parameter change of the control device 130 according to the user input with the motion degree of the object according to the parameter change. The mapping table generator 215 may further accurately detect the user control object by repeatedly performing such a process during the certain period of time or regarding the certain number of frames, and generate the mapping table, further accurately indicating the correlation between motion of the detected user control object and the parameter value.

Figure 4:
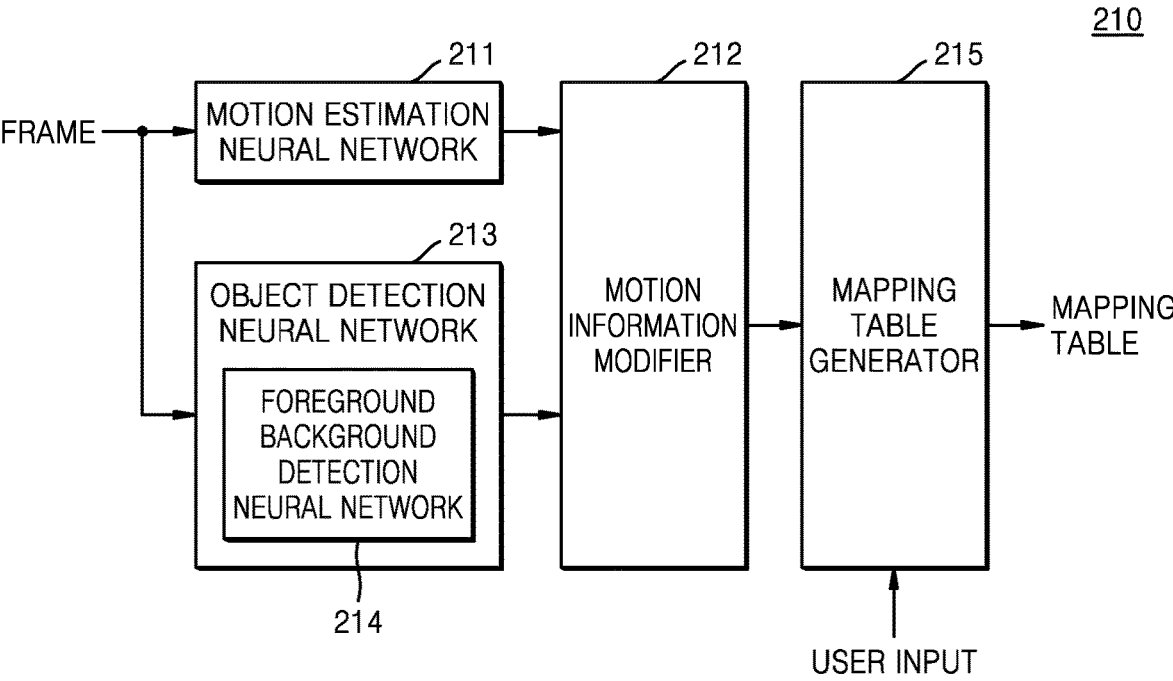
FIG. 4 is a block diagram for describing a processor included in a display device generating a mapping table, according to an embodiment.

FIG. 4 is a block diagram for describing a processor included in a display device generating a mapping table, according to an embodiment.

Referring to FIG. 4, the processor 210 may include the motion estimation neural network 211, the object detection neural network 213, and the mapping table generator 215. Furthermore, the processor 210 may further include a motion information modifier 212.

Furthermore, the processor 210 of FIG. 4 may be an example of the processor 210 of FIG. 3. Hereinafter, descriptions overlapping those of FIG. 3 are omitted.

In FIG. 4, the object detection neural network 213 may include a foreground background detection neural network 214. The foreground background detection neural network 214 may be a neural network trained to analyze and classify a frame to identify whether an object included in the frame is a foreground or a background. The foreground background detection neural network 214 may be an algorithm detecting a location of the object from input data, a set of algorithms, software executing the set of algorithms, and/or hardware executing the set of algorithms.

In game data, a user control object may be located at a center or slightly below the center. For example, the user control object is often a foreground object in the frame, and thus, the foreground background detection neural network 214 may identify whether the object detected from the frame is a foreground object or a background object such that the user control object is further easily detected.

The object detection neural network 213 may detect a plurality of objects from the frame and transmit the same to the motion information modifier 212. Furthermore, the object detection neural network 213 may transmit, to the motion information modifier 212, an object identified as a foreground object by the foreground background detection neural network 214 from among the detected objects.

The motion information modifier 212 may obtain motion information regarding pixels included in the frame, and obtain information about the detected objects and information about which one is a foreground object, from the object detection neural network 213.

The motion information modifier 212 may obtain, for each object included in the frame, motion information of a pixel included in an object, and modify the motion information. The motion information modifier 212 may modify motion information regarding pixels included in the detected object according to occurrence of an event regarding the object. The event regarding the object may include at least one of zoom-in, zoom-out, or rotation.

For example, when the detected object is a user control object, a size of the user control object may increase or decrease according to a user control. For example, a user may transmit a user input for increasing or decreasing the size of the user control object by using the control device 130. Furthermore, the user may transmit a user input for rotating the object by using the control device 130. When such various events occur, motion information stored in a mapping table may also change, and thus, when an event occurs according to a user input, the motion information modifier 212 may calculate a statistical characteristic of motion information to accurately predict how motion information of the user control object changes.

When an event, such as zoom-in or zoom-out, occurs, the motion information modifier 212 may increase or decrease the number of pixels included in the object by two times or three times compared to the occurrence of the event, and predict motion information regarding the increased or decreased pixels. Furthermore, when an event, such as rotation, occurs, the motion information modifier 212 may predict motion information regarding changed pixels considering that the number of pixels included in the object changes according to the rotation.

The motion information modifier 212 may predict a change in the motion information according to occurrence of various events, and modify the motion information of the pixels by reflecting the change.

The mapping table generator 215 may obtain, from the motion information modifier 212, the motion information that is obtained and modified for each object included in the frame, and generate the mapping table by using the motion information. The mapping table generator 215 may identify the user control object according to a motion degree of the object according to the user input, and generate the mapping table by using a relationship between the user input and the motion information of pixels included in the identified user control object.

Figure 5:
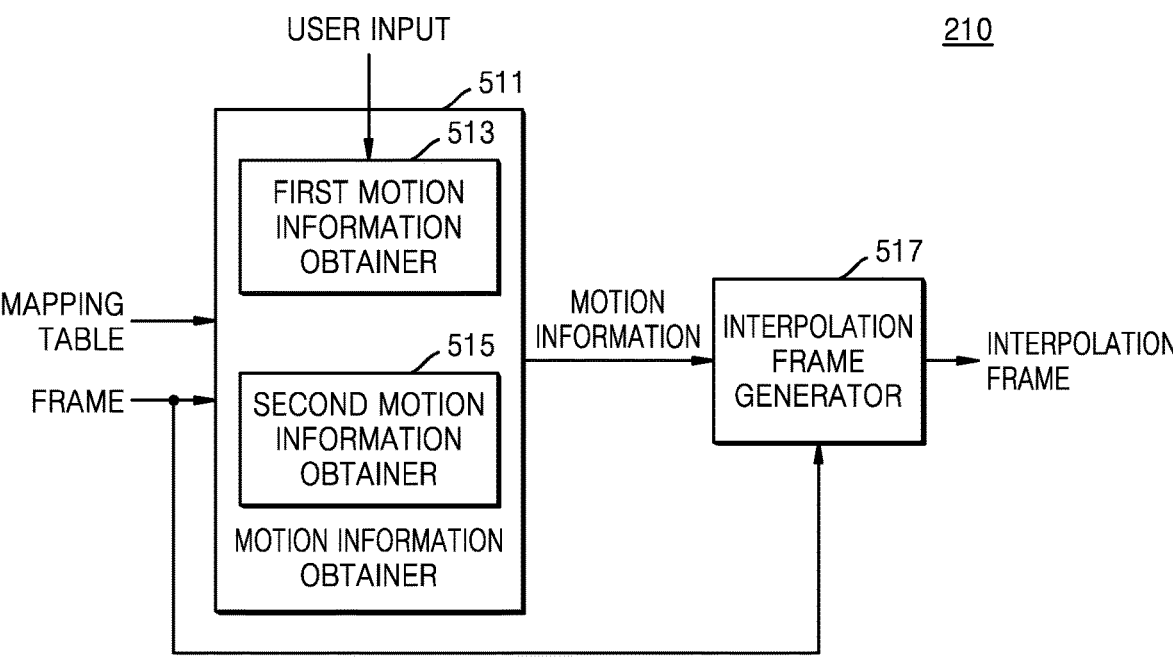
FIG. 5 is a block diagram for describing a processor included in a display device generating an interpolation frame, according to an embodiment.

FIG. 5 is a block diagram for describing a processor included in a display device generating an interpolation frame, according to an embodiment.

Referring to FIG. 5, the processor 210 may include a motion information obtainer 511 and an interpolation frame generator 517. The motion information obtainer 511 may obtain motion information or an optical flow from an input frame.

The motion information obtainer 511 may include a first motion information obtainer 513 and a second motion information obtainer 515.

The first motion information obtainer 513 may obtain motion information regarding a user control object included in the frame. Hereinafter, for convenience of descriptions, the motion information regarding the user control object will be referred to as first motion information.

The first motion information obtainer 513 may identify the user control object from the frame by using a pre-generated and stored mapping table. As described above, the mapping table may include information for identifying the user control object controlled according to a user input. The information for identifying the user control object may include a boundary of the user control object or a coordinate value or pixel number of a pixel included in the user control object.

Upon receiving the user input, the first motion information obtainer 513 may obtain a parameter change value of the control device 130. The parameter change value may be included in the user input.

As described above, the mapping table may include a mapping relationship between the motion information of the user control object and a parameter value of the control device 130 according to the user input. A parameter of the control device 130 may include various variables, such as, for example, a moving direction or moving distance according to the user input using the control device 130. The user input may correspond to operation of a joystick or a keyboard resulting in a moving command time, a moving speed, a moving acceleration, or strength or amplitude of the user input.

The first motion information obtainer 513 may obtain, from the mapping table, the motion information of the user control object (e.g., the first motion information), mapped to a parameter change of the control device 130 according to the user input. The first motion information may be motion information regarding all user control objects or may include motion information regarding each of a plurality of pixels included in the user control object.

As such, the first motion information obtainer 513 may further accurately predict motion of the user control object since the first motion information regarding the user control object is directly obtained by using the pre-generated mapping table based on the user input.

The first motion information obtainer 513 may transmit the obtained first motion information to the interpolation frame generator 517.

The second motion information obtainer 515 may obtain motion information regarding pixels other than the user control object, from the frame.

The second motion information obtainer 515 may obtain, from the frame, the motion information regarding remaining pixels other than the pixels included in the identified user control object by using the mapping table, instead of obtaining motion information regarding the entire frame. Hereinafter, for convenience of descriptions, the motion information regarding the pixels other than the pixels included in the user control object will be referred to as second motion information.

According to one or more embodiments, the second motion information obtainer 515 may use the motion estimation neural network 211 described with reference to FIG. 3. For example, the second motion information obtainer 515 may use a neural network trained to obtain an optical flow, (e.g., motion information), from input data. The second motion information obtainer 515 may obtain motion information per pixel based on at least two frames, by using an algorithm for obtaining motion information per pixel from input data, a set of algorithms, software executing the set of algorithms, and/or hardware executing the set of algorithms.

The second motion information obtainer 515 may use a CNN-based neural network, such as a CNN, a DCNN, or a CapsNet neural network.

According to one or more embodiments, the second motion information obtainer 515 may use a DNN performing an operation through a plurality of layers. The second motion information obtainer 515 may extract a feature map from each layer regarding each of at least two input frames, and predict motion information by using the feature map extracted for each layer.

When output of game data starts, the second motion information obtainer 515 may predict the motion information regarding all pixels of the input frame until the mapping table is generated, and after the mapping table is generated, predict the motion information only for the remaining pixels other than those included in the user control object. For example, the second motion information obtainer 515 may predict the motion information regarding only some pixels from among the pixels included in the frame instead of the entire frame after the mapping table is generated, and thus, a throughput and complexity caused when the motion information is estimated for the entire frame may be advantageously reduced.

The second motion information obtainer 515 may transmit the second motion information to the interpolation frame generator 517.

The interpolation frame generator 517 may generate an interpolation frame between the at least two frames by using the at least two frames and the motion information obtained from the motion information obtainer 511.

According to one or more embodiments, the interpolation frame generator 517 may use a neural network trained to receive the motion information and the frame, analyze and classify the motion information and the frame, and generate a new interpolation frame. The interpolation frame generator 517 may use an algorithm for combining a new frame from input data, a set of algorithms, software executing the set of algorithms, and/or hardware executing the set of algorithms.

The interpolation frame generator 517 may use a CNN. The CNN may be subdivided into a DCNN or a CapsNet neural network.

The interpolation frame generator 517 may generate the interpolation frame by using motion information per block or motion information per pixel of the input frame, according to one or more interpolation methods. In one or more examples, the interpolation frame generator 517 may use one of a kernel-based method, a phase-based method, and a combination thereof.

For example, the interpolation frame generator 517 may stack at least two input frames by using a general CNN to use the same as input data, and output the interpolation frame to which the optical flow is reflected, as a final output, by passing the input data through a convolutional layer one or more times.

In one or more examples, the interpolation frame generator 517 may obtain the feature map by passing at least two input frames each through a convolutional layer, and pass the obtained feature map through a correlation layer and then the convolutional layer again, thereby generating the interpolation frame by comparing the feature maps obtained from the frames. Here, the correlation layer may refer to a layer using the same operation as the convolution layer, but using mutual inputs instead of weight values.

In one or more examples, the interpolation frame generator 517 may learn hierarchical features by collecting context information from an adjacent pixel of the input frame. The interpolation frame generator 517 may combine a new frame through depth estimation, content extraction, kernel estimation, and frame synthesis by using the input frame and the motion information received from the motion information obtainer 511.

The interpolation frame generator 517 may generate the interpolation frame from the input frame and the motion information by using various methods other than the method described above. The interpolation frame generator 517 may improve the quality of a video by inserting a predicted virtual frame between frames to increase the number of frames.

Figure 6:
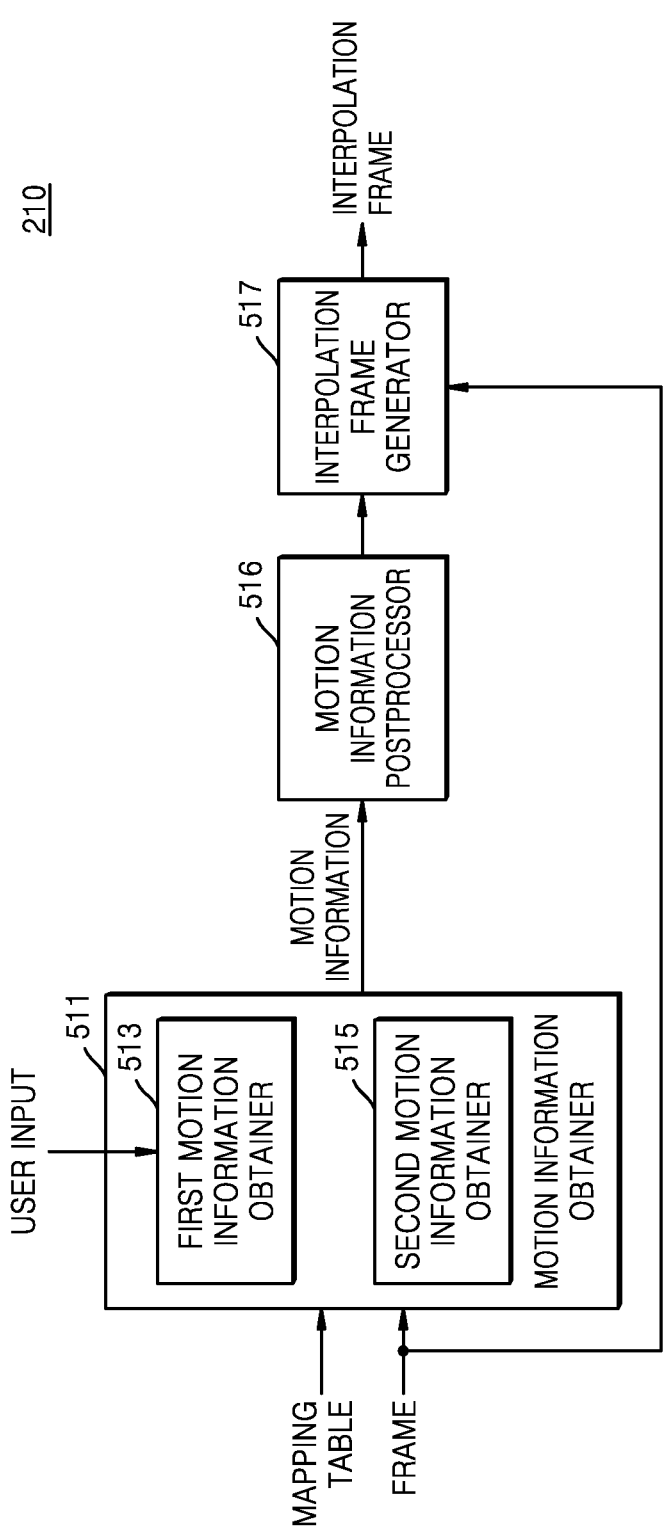
FIG. 6 is a block diagram for describing a processor included in a display device generating an interpolation frame, according to an embodiment.

FIG. 6 is a block diagram for describing a processor included in a display device generating an interpolation frame, according to an embodiment.

Referring to FIG. 6, the processor 210 may include the motion information obtainer 511, a motion information post processor 516, and the interpolation frame generator 517. The processor 210 of FIG. 6 may be an example of the processor 210 of FIG. 5. Accordingly, descriptions about details overlapping those described in FIG. 5 are omitted.

The motion information obtainer 511 may obtain the motion information or the optical flow from the input frame. The motion information obtainer 511 may include the first motion information obtainer 513 for obtaining the first motion information regarding the user control object included in the frame, and the second motion information obtainer 515 for obtaining the second motion information regarding the pixels other than those included in the user control object.

The motion information post processor 516 may post process the motion information received from the motion information obtainer 511.

The motion information post processor 516 may post process the motion information by using one or more methods. According to one or more embodiments, the motion information post processor 516 may modify motion information of a certain pixel or certain sub-region based on motion information of an adjacent pixel or adjacent sub-region.

The motion information post processor 516 may modify the motion information of the certain pixel or certain sub-region to be more natural by using the motion information of the adjacent pixel or adjacent sub-region. For example, the motion information post processor 516 may modify motion information of a first pixel included in the frame by using at least one of adjacent pixels neighboring the first pixel (e.g., at least one of adjacent pixels located at the right, left, top, or bottom of the first pixel).

The motion information post processor 516 may modify the motion information of the first pixel, also considering the adjacent pixels and the first pixel. For example, the motion information post processor 516 may modify the motion information of the first pixel by using an average of values of the motion information of the first pixel and adjacent pixels.

According to one or more embodiments, the motion information post processor 516 may group motion information per pixel for each object or for each block of a certain size (e.g., N×N, M×N, etc.) to further reduce computation time. Accordingly, the motion information post processor 516 may obtain motion information for each object or for each block by grouping the motion information for each pixel in units of objects or in units of certain blocks. For example, the motion information post processor 516 may obtain, as motion information regarding an entire certain block, an average value, a maximum value, or an intermediate value of pieces of motion information per pixel included in the certain block.

The motion information post processor 516 may transmit the motion information per block or per object to the interpolation frame generator 517.

The interpolation frame generator 517 may further quickly generate the interpolation frame with less throughput than when each pixel-based motion information is used, by using the motion information grouped per object or per block.

Figure 7:
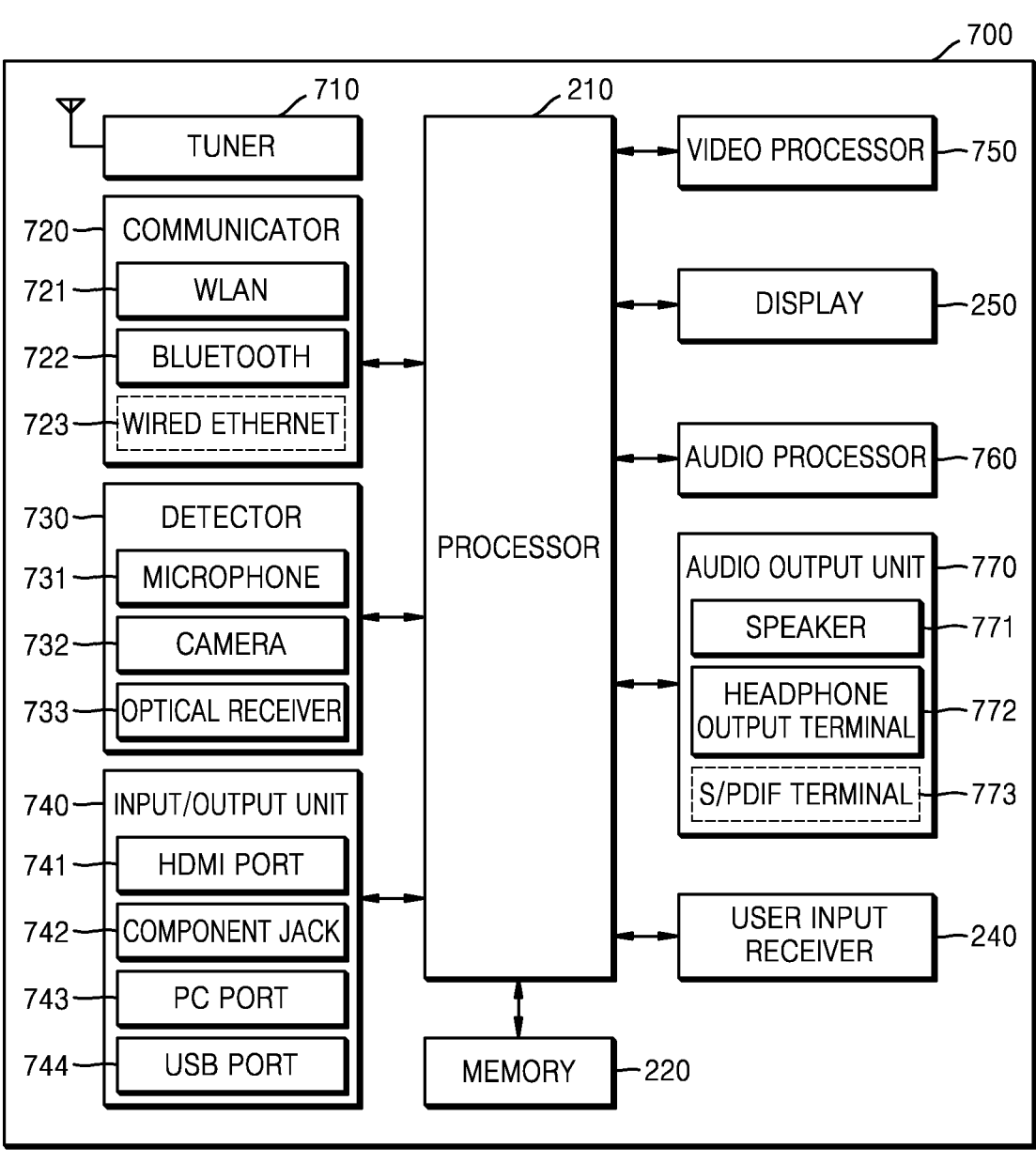
FIG. 7 is an internal block diagram of a display device according to an embodiment.

FIG. 7 is an internal block diagram of a display device according to an embodiment.

Referring to FIG. 7, a display device 700 may include the processor 210, the memory 220, the user input receiver 240, and the display 250. Furthermore, the display device 700 may further include a tuner 710, a communicator 720, a detector 730, an input/output unit 740, a video processor 750, an audio processor 760, and an audio output unit 770.

The display device 700 of FIG. 7 may include the display device 200 of FIG. 2. Accordingly, descriptions overlapping those described in FIG. 2 are omitted.

The display device 700 may be implemented as various electronic devices configured to output game data, and for example, may be a desktop computer, a digital TV, a smartphone, a tablet PC, a laptop PC, a netbook computer, a PDA, or a PMP.

The tuner 710 may tune and select only a frequency of a channel to be received by the display device 700 among many radio wave components by performing amplification, mixing, and resonance on broadcast content received via wires or wirelessly. The content received through the tuner 710 is decoded (for example, audio-decoded, video-decoded, or additional information-decoded) and divided into audio, video, and/or additional information. The divided audio, video, and/or additional information may be stored in the memory 220 under control by the processor 210.

The communicator 720 may transmit/receive a signal by performing communication with an external device connected through a wired/wireless network, based on control by the processor 210. The communicator 720 may include at least one communication module, such as a short-range communication module, a wired communication module, a mobile communication module, and a broadcast reception module. The communication module may include a communication module configured to perform data transmission/reception through a tuner, Bluetooth, a wireless local area network (WLAN), wireless broadband (Wibro), or a network designed based on a communication standard, such as world interoperability for microwave access (Wimax), CDMA, or WCDMA.

The communicator 720 may download or web-browse a game program or game application from an external device or a server. The communicator 720 may include one of a WLAN 721, Bluetooth 722, and wired Ethernet 723, based on performance and structure of the display device 700. Furthermore, the communicator 720 may include a combination of the WLAN 721, Bluetooth 722, and wired Ethernet 723.

The communicator 720 may receive a control signal through a control device, such as a remote controller, a mobile phone, a joystick, or a wireless mouse, according to control by the processor 210. The control signal may be a Bluetooth type, a radio frequency (RF) signal type, or a Wi-Fi type. The communicator 720 may further include short-range communication other than the Bluetooth 722, such as near field communication (NFC) or Bluetooth low energy (BLE). According to one or more embodiments, the communicator 720 may transmit/receive a connection signal to/from the external device through the short-range communication, such as the Bluetooth 722 or BLE.

The detector 730 may detect a voice of a user, an image of the user, or an interaction of the user, and may include a microphone 731, a camera 732, and a light receiver 733. The microphone 731 may receive speech uttered by the user, convert the received speech into an electric signal, and output the electric signal to the processor 210.

The camera 732 may include a sensor and a lens, and may capture an image on a screen.

The light receiver 733 may receive an optical signal (including a control signal). The light receiver 733 may receive the optical signal corresponding to a user input (e.g., touch, press, touch gesture, speech, or motion) from a control device, such as a remote controller, a mobile phone, or a mouse. A control signal may be extracted from the received optical signal based on control by the processor 210.

The input/output unit 740 may include the data input unit 230 shown in FIG. 2. The input/output unit 740 may receive based on control by the processor 210, various videos (e.g., a moving image signal or a still image signal) including game data, audio (e.g., a speech signal or a music signal), and additional information (e.g., a description about content, content title, or a content storage location), from an external database, server, or game device. The additional information may include metadata regarding content.

The input/output unit 740 may include one of a high-definition multimedia interface (HDMI) port 741, a component jack 742, a PC port 743, and a universal serial bus (USB) port 744. The input/output unit 740 may include a combination of the HDMI port 741, the component jack 742, the PC port 743, and the USB port 744.

The video processor 750 may process image data to be displayed by the display 250, and may perform various image processing operations on the image data, such as decoding, rendering, scaling, noise-filtering, frame rate conversion, and resolution conversion.

The audio processor 760 may perform a process on audio data. The audio processor 760 may perform various processes one the audio data, such as decoding, amplification, or noise filtering.

The audio output unit 770 may output audio included in content received through the tuner 710, audio input through the communicator 720 or input/output unit 740, or audio stored in the memory 220, according to control by the processor 210. The audio output unit 770 may include at least one of a speaker 771, a headphone output terminal 772, or a Sony/Philips digital interface (S/PDIF) terminal 773.

The user input receiver 240 according to one or more embodiments may receive a user input for controlling the display device 700. The user input receiver 240 of FIG. 7 performs same functions as the user input receiver 240 of FIG. 2, and thus, the same reference numeral is used.

The user input receiver 240 may include various types of user input devices including a touch panel detecting a user's touch, a button receiving a push operation of the user, a wheel receiving a rotation operation of the user, a keyboard, a dome switch, a microphone for speech recognition, and a motion detection sensor sensing motion, but is not limited thereto. Furthermore, when the display device 700 is manipulated by a remote controller, the user input receiver 240 may receive a control signal received from the remote controller.

According to one or more embodiments, the user may enable various functions of the display device 700 to be performed by controlling the display device 700 through the user input receiver 240. The user may control a user control object in a game video output from the display device 700 by using the user input receiver 240.

The memory 220 may store at least one instruction. The memory 220 may store at least one program executed by the processor 210. The memory 220 may store at least one neural network and/or a pre-defined operation rule or an AI model. Furthermore, the memory 220 may store data input to or output from the display device 200.

According to one or more embodiments, the memory 220 may store a mapping table generated by the display device 200. In one or more examples, when the game data includes metadata, the memory 220 may store the metadata regarding the game data.

The processor 210 may control overall operations of the display device 200. The processor 210 may execute the one or more instructions stored in the memory 220 to control the display device 200 to operate.

According to one or more embodiments, the processor 210 may identify the user control object moving according to control by the user in a frame included in a video, and obtain first motion information regarding the user control object.

According to one or more embodiments, the processor 210 may obtain second motion information regarding remaining pixels excluding pixels included in the user control object from among pixels included in the frame, by using a first neural network. The first neural network may be a motion estimation neural network.

According to one or more embodiments, the processor 210 may post process the first motion information and the second motion information. For example, the processor 210 may post process motion information by performing at least one of modifying motion information of a certain pixel included in the frame by using motion information of at least one adjacent pixel adjacent to the certain pixel, or obtaining motion information per object by grouping pixels included in the frame per object.

According to one or more embodiments, the processor 210 may receive the frame and generate the mapping table, based on a user input regarding an object included in the received frame, before the first motion information is obtained. The processor 210 may obtain motion information regarding all pixels included in the received frame by using the first neural network.

To generate the mapping table, the processor 210 may detect at least one object from the received frame by using a third neural network. The third neural network may be an object detection neural network. The processor 210 may identify the user control object controlled according to a user input, from the detected object.

The processor 210 may detect whether the object is a foreground object or a background object by using the third neural network. The processor 210 may identify the user control object from the foreground object.

The processor 210 may generate the mapping table, based on a correlation between the user input and the motion information of the pixels included in the user control object. The processor 210 may obtain a parameter change of a controller (e.g., a control device), according to the user input, and generate the mapping table by mapping the motion information of the pixels included in the user control object according to the parameter change of the controller. A parameter of the controller may include at least one of a moving direction, a moving distance, a moving time, a moving speed, a moving acceleration, moving strength, or moving amplitude.

The processor 210 may modify the motion information regarding the pixels included in the detected object, based on an event regarding the object. For example, when an event including at least one of zoom-in, zoom-out, or rotation occurs, the processor 210 may modify the motion information of the pixels according to the event.

The processor 210 may receive the user input during a certain period of time, and update the mapping table based on the user input during the certain period of time.

The processor 210 may generate the mapping table for each type of controller receiving the user input.

The processor 210 may generate the mapping table whenever a game starts. In one or more examples, the processor 210 may generate the mapping table only when the game is initially set up. When the mapping table is generated, the mapping table becomes a pre-stored mapping table, which is used by the processor 210 thereafter.

Figure 8:
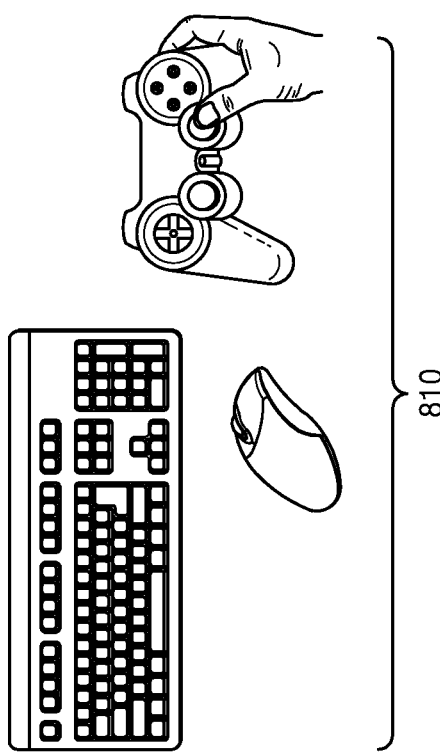
FIG. 8 is a diagram for describing a user control object moving according to a user input, according to an embodiment.

FIG. 8 is a diagram for describing a user control object moving according to a user input, according to an embodiment.

Referring to FIG. 8, a user may control a user control object by using a control device 810. Screens 820 and 830 of FIG. 8 show an example in which user control objects 821 and 831 move according to an input of the user. For example, screen 820 may represent a position of the user control object 821 at time T1, and screen 830 may represent a position of the user control object 831 (e.g., same object as in screen 820) at time T2 in which the object is moved according to an input of the user.

The control device 810 may be realized as various types of controllers for controlling game data output from a display device, such as a remote controller, a mobile phone, a joystick, a keyboard, or a mouse.

The control device 810 may include a key or a button for controlling the game data. The control device 810 may include at least one of various types of control keys or control buttons, such as a direction key for moving an object included in a video in a left and right direction or an up and down direction, a rotation key for rotating a direction of the object, a zoom-in or zoom-out key for increasing or decreasing a size of the object, an enter key for selecting an item, and a key for returning to a previous screen.

The video included in the game data may include a plurality of frames. The frame may include at least one object. The display device may output the game data in units of frames.

The user may control motion of a user control object that may be controlled by the user from among objects included in the frame, by using the control device 810. To control motion of the user control object, the user may transmit a user input by using the control device 810. The user input may include a parameter value of the control device 810. For example, when the user manipulates the control device 810, the parameter value of the control device 810 corresponding to user manipulation may be included in the user input and transmitted to the display device.

For example, the parameter value when the user moves a joystick in a right direction with strength of x may be 2. When the parameter value is 2 and the user control object moves in the right direction by y pixels, the display device may map the parameter value 2 and motion information y.

The display device may map the parameter value and the corresponding motion information and store the same to generate a mapping table.

The parameter value of the control device 810, according to the user input, may vary according to types of control devices. For example, even when the user moves the joystick and presses a mouse button with same strength, a parameter value sensing the user input may vary according to the control devices 810. Accordingly, the display device may generate different mapping tables according to a respective type of control device 810.

When the new control device 810 is connected, the display device may identify whether there is a mapping table pre-stored for the newly connected control device 810, and when there is no pre-stored mapping table, generate the mapping table for the new control device 810.

When the mapping table is newly generated or has been already generated and stored in the display device, the display device may obtain, from the mapping table, the motion information of the user control object according to the user input. For example, as in the above example, when the current user input includes the parameter value 2, the display device may extract, from the mapping table, the motion information y mapped to the parameter value 2 and stored, and control the user control object to move y pixels from a current location by using the motion information y.

Figure 9:
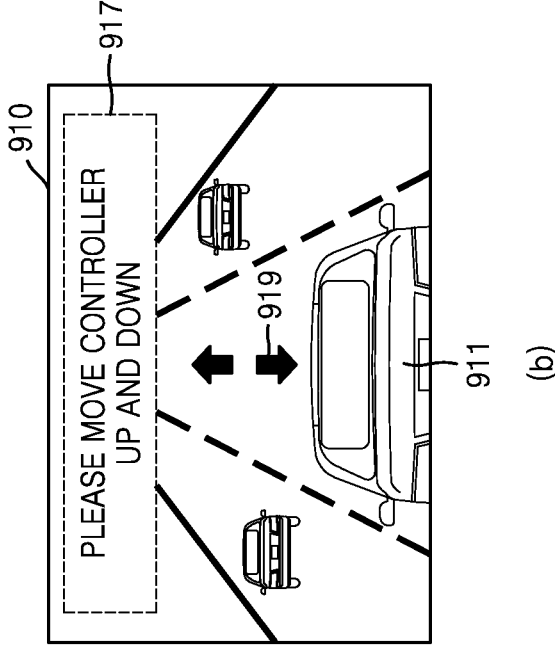
FIG. 9 is a diagram for describing a display device outputting an interface screen requesting a user for a user input, to generate a mapping table, according to an embodiment.
Figure 9:
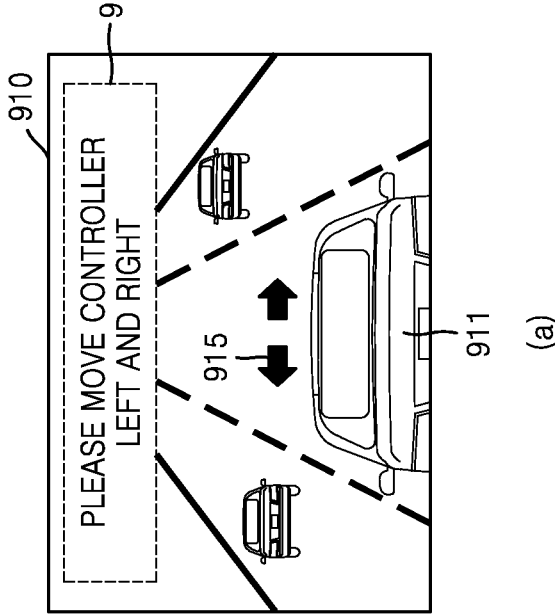

FIG. 9 is a diagram for describing a display device outputting an interface screen requesting a user for a user input, to generate a mapping table, according to an embodiment.

When a new game is initiated, the display device may generate the mapping table. Alternatively, the display device may newly generate the mapping table when a type of an object changes as a new game starts after one session ends during the game.

For example, as shown in FIG. 9, when the game is a car racing game, the user may directly select a style, color, model, and performance of a car to be controlled. When the user selects an object having a different performance from a previous object (e.g., when an agility level of motion, such as a speed or rotatory power of the car) is different from the previous object, a mapping table prepared based on the previous object may not be suitable to a new object having a new performance. For example, the previous object may move by y when a parameter value of a user input is 2, but the new object may move by z instead of y for the same user input. When this situation occurs, the display device may newly generate a mapping table suitable to a newly selected user control object.

According to one or more embodiments, to generate the mapping table, the display device may output the interface screen by overlaying the interface screen on a frame. The interface screen may include content requesting the user to select a direction for moving a control device or strength (e.g., force) for moving the control device.

FIG. 9 illustrates examples ((a), (b)) of the interface screen on a display 910. Examples (a) and (b) of FIG. 9 respectively illustrate interface screens 913 and 915 and interface screens 917 and 919. Here, the interface screens 913 and 917 output at the top include, in text, requests regarding user inputs, and the interface screens 915 and 919 output at the bottom include arrows located near a user control object 911. A user may move a user control object left and right or up and down by controlling a controller by looking at an interface screen, such as text or an arrow.

The display device may receive a parameter value change according to manipulation of the user on the control device, and generate a mapping table by mapping a motion degree of a user control object that is moving according to a parameter value.

FIG. 10 illustrates a mapping table according to an embodiment.

Referring to FIG. 10, a mapping table 1000 may include a value of a motion vector of an object mapped to a parameter value. In one or more examples, there may be a plurality of user control objects. For example, a user control object that may be controlled for each user may be included in a frame in a case of a game in which several people may participate (e.g., multiplayer game). When there are a plurality of user control objects, even when a parameter value of a control device according to a user input is the same, values of motion vectors of the user control objects corresponding to the same parameter value may vary.

For example, when two users play a car racing game together by using two joysticks, motion of a car corresponding to a same parameter may vary depending on performance of the car in the game. For example, even when the two users control motion of the cars by manipulating the joysticks with same strength, a motion degree of each user control object may vary, and thus, the mapping table 1000 may include motion information for each of a plurality of user control objects when there are the plurality of user control objects.

The mapping table 1000 may include, for each parameter value, a motion vector representing a moving direction and a moving amplitude of an object mapped to each parameter value (e.g., V1-V3 and V1'-V3'). The motion vector of the object may be represented by one value for all user control objects, or may be represented by a value for each of a plurality of pixels included in the user control object.

When the mapping table 1000 is pre-stored, a display device may identify the user control object from objects included in a frame when the user input is received, and obtain motion information according to the user input by using the mapping table 1000 of the identified user control object. The display device may search a mapping table for a parameter value according to a user input, obtain a value of a motion vector stored by being mapped to a found parameter value, and predict the value of the motion vector as motion information of an interpolation frame.

Figure 11:
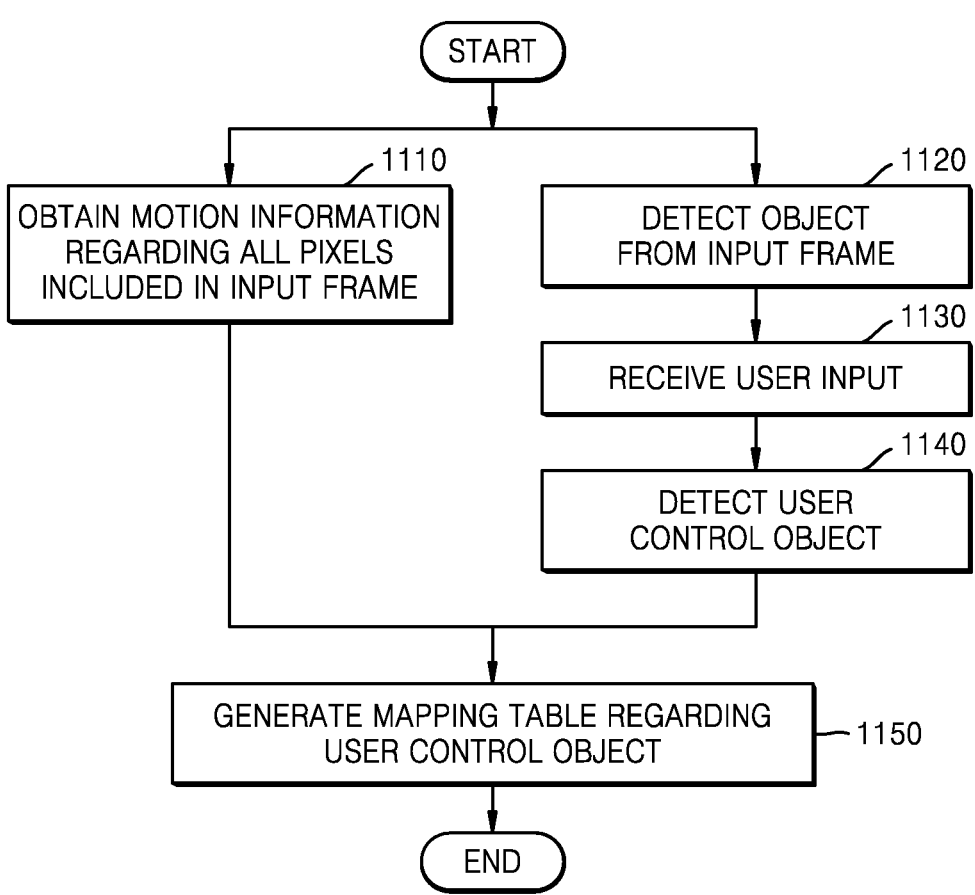
FIG. 11 is a flowchart of operations of generating a mapping table, according to an embodiment.

FIG. 11 is a flowchart of operations of generating a mapping table, according to an embodiment.

Referring to FIG. 11, when a frame is input, a display device may obtain motion information regarding all pixels included in the input frame (operation 1110). The display device may obtain motion information per pixel from the frame, by using a motion estimation neural network trained to obtain motion information from input data.

The display device may extract a feature map from each layer regarding each of at least two input frames, and predict motion information per pixel by using the feature map extracted for each layer.

When the frame is input, the display device may detect an object from the input frame (operation 1120). The display device may detect the object from the input frame by using an object detection neural network trained to detect an object by analyzing and classifying input data. The display device may detect at least one object from the frame by using various segmentation algorithms.

The display device may receive a user input regarding a control device (operation 1130). The user input may include a parameter value of the control device. The display device may detect a user control object controlled according to the user input, among the detected object (operation 1140).

When there are a plurality of objects, the display device may detect, as the user control object from among the plurality of objects, an object with the highest correlation between the user input and a motion vector.

The display device may generate a mapping table by mapping a motion degree of the detected user control object according to the user input (operation 1150). The display device may obtain a parameter change of the control device included in the user input, and generate the mapping table by obtaining motion information of each of pixels included in the user control object when a parameter changes and mapping the same, or by obtaining motion information of the entire user control object according to the parameter change and mapping the same.

Figure 12:
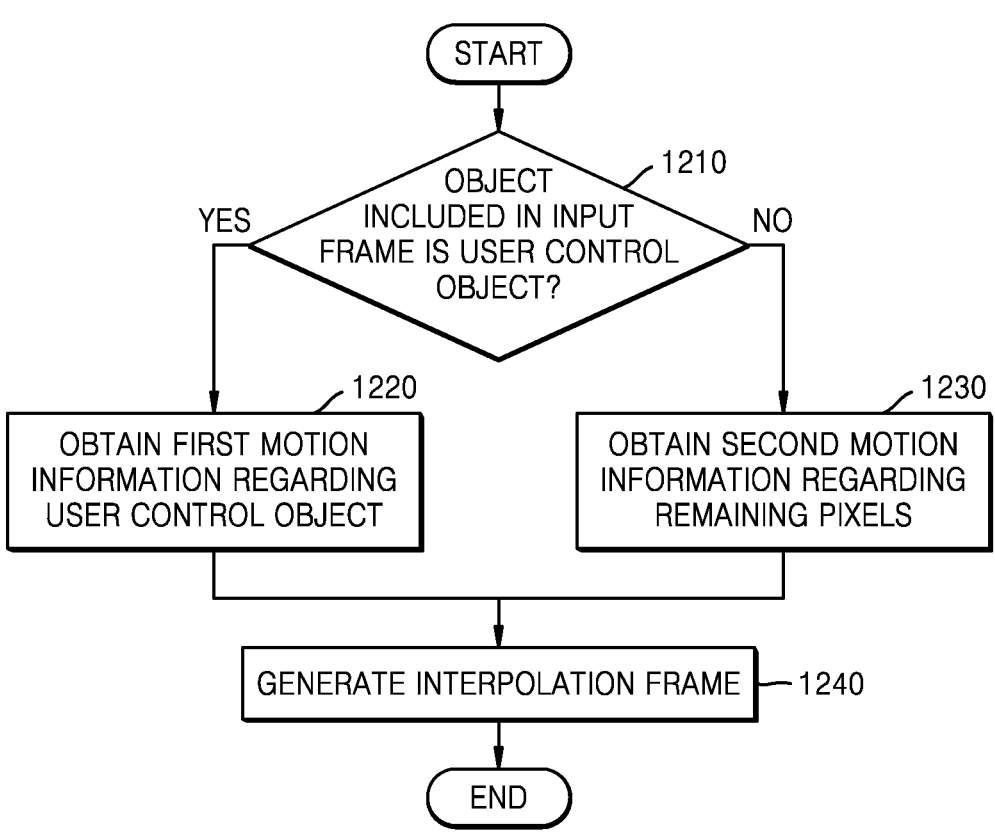
FIG. 12 is a flowchart of operations by which a display device generates an interpolation frame, according to an embodiment.

FIG. 12 is a flowchart of operations by which a display device generates an interpolation frame, according to an embodiment.

Referring to FIG. 12, when a frame is input, the display device may identify whether an object included in the input frame is a user control object (operation 1210). The display device may extract, from a pre-generated and stored mapping table, identification information, such as a pixel coordinate, a pixel number, or a boundary, of the user control object, and identify the user control object based on the identification information.

In response to a determination that the object included in the input frame is the user control object ("YES"), the process proceeds from operation 1210 to operation 1220. The display device may obtain first motion information based on a user input and the mapping table, regarding a pixel included in the user control object, from among pixels included in the frame (operation 1220). When the user input is received, the display device may obtain a parameter value included in the user input and corresponding motion information from the mapping table to obtain one piece of motion information regarding the entire user control object or motion information regarding each of the pixels included in the user control object.

In response to a determination that the object included in the input frame is not the user control object ("NO"), the process proceeds from operation 1210 to operation 1230. The display device may obtain second motion information regarding remaining pixels excluding pixels included in the user control object (operation 1230). The display device may obtain the second motion information by using a motion estimation neural network, regarding the remaining pixels excluding the pixels included in the user control object. The motion estimation neural network may be an algorithm obtaining motion information per pixel from input data, a set of algorithms, software executing the set of algorithms, and/or hardware executing the set of algorithms.

The display device may generate an interpolation frame between at least two frames by using the first motion information obtained regarding the user control object, the second motion information obtained regarding the remaining pixels, and the at least two frames (operation 1240).

Figure 13:
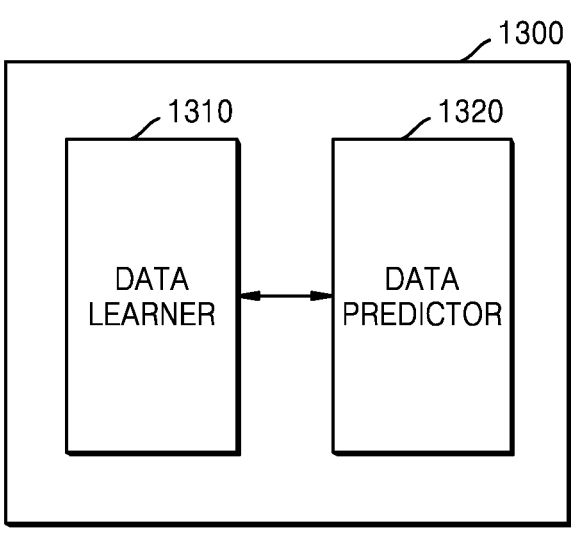
FIG. 13 is a block diagram of a configuration of a computing device, according to an embodiment.

FIG. 13 is a block diagram of a configuration of a computing device 1300, according to an embodiment.

Referring to FIG. 13, the computing device 1300 may include a data learner 1310 and a data predictor 1320.

The data learner 1310 may learn a criterion for obtaining motion information from a frame. The data learner 1310 may learn a criterion regarding which information of the frame is used to predict the motion information from the frame. Furthermore, the data learner 1310 may learn a criterion regarding how to recognize the motion information by using information of the frame. The data learner 1310 may obtain data to be used for training, and apply the obtained data to a data prediction model described below. The data learner 1310 may use, as the data to be used for training, a frame including at least one moving object. The data learner 1310 may learn a criterion for detecting a feature, location, and arrangement of an object or pixel in an image.

The data predictor 1320 may predict the motion information from the image according to a pre-set criterion according to learning, and output a predicted result. The data predictor 1320 may predict the motion information from a certain image by using a trained data prediction model. A result value output by the data prediction model by using the image as an input value may be used to update the data prediction model.

At least one of the data learner 1310 or the data predictor 1320 may be manufactured in a form of at least one hardware chip and mounted on an electronic device. For example, at least one of the data learner 1310 or the data predictor 1320 may be manufactured in a form of a dedicated hardware chip for AI or manufactured as a part of an existing general-purpose processor (for example, a CPU or application processor) or graphic-dedicated processor (for example, a GPU), and mounted on various types of electronic devices described above.

In one or more examples, the data learner 1310 and the data predictor 1320 may be mounted on one electronic device or on individual electronic devices. For example, one of the data learner 1310 and the data predictor 1320 may be included in an electronic device and the other one may be included in a server. Furthermore, the data learner 1310 and the data predictor 1320 may communicate with each other wirelessly or via wires such that model information constructed by the data learner 1310 may be provided to the data predictor 1320 or data input to the data predictor 1320 may be provided to the data learner 1310 as additional training data.

Furthermore, at least one of the data learner 1310 or the data predictor 1320 may be realized as a software module. When at least one of the data learner 1310 or the data predictor 1320 is realized as a software module or program module including an instruction, the software module may be stored in a non-transitory computer-readable medium. Furthermore, in one or more examples, at least one software module may be provided by an operating system (OS) or a certain application. Alternatively, a part of the at least one software module may be provided by the OS and the remaining part may be provided by the certain application.

Figure 14:
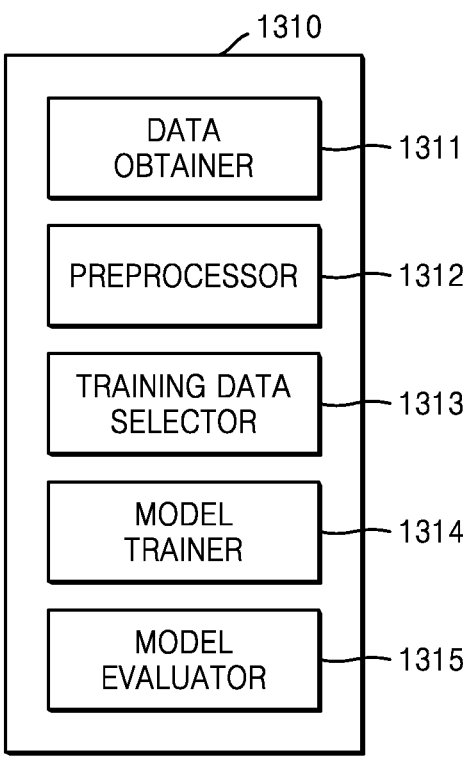
FIG. 14 is a block diagram of a data learner according to an embodiment.

FIG. 14 is a block diagram of the data learner 1310 according to an embodiment.

Referring to FIG. 14, the data learner 1310 according to one or more embodiments may include a data obtainer 1311, a preprocessor 1312, a training data selector 1313, a model trainer 1314, and a model evaluator 1315.

The data obtainer 1311 may obtain data required to learn to detect motion information from a frame. The data obtainer 1311 may obtain the data from at least one of a database or an external server, such as a social network server or a cloud server, which are connected to the computing device 1300 through a network. The data obtainer 1311 may obtain the data provided by content providers.

The preprocessor 1312 may preprocess the obtained data such that the data may be used to learn to detect the motion information from the frame. The preprocessor 1312 may process the obtained data in a pre-set format such that the model trainer 1314 described below may use the obtained data to learn to predict the motion information from the frame. For example, the preprocessor 1312 may remove, from the obtained data, redundant data or data having a slim possibility, and process the data in the pre-set format, for example, vectorizing the data, but embodiments are not limited thereto.

The training data selector 1313 may select data required for learning from among the preprocessed data. The selected data may be provided to the model trainer 1314. The training data selector 1313 may select the data required for learning from the preprocessed data, according to a pre-set criterion for obtaining the motion information from the frame. Furthermore, the training data selector 1313 may select the data according to a pre-set criterion through training by the model trainer 1314 described below.

The model trainer 1314 may learn a criterion regarding which training data is to be used to predict the motion information from the frame. The model trainer 1314 may learn types, the number, and levels of frame attributes used to predict the motion information from the frame.

Furthermore the model trainer 1314 may train a data prediction model used to predict the motion information from the frame, by using the training data. Here, the data prediction model may be a pre-constructed model. For example, the data prediction model may be a model pre-constructed by receiving base training data.

The data prediction model may be constructed considering an application field of a prediction model, a purpose of training, or a computer performance of a device. The data prediction model may be a model based on, for example, a neural network. For example, a model such as a DNN, an RNN, or a BRDNN, may be used as the data prediction model, but the data prediction model is not limited thereto.

According to one or more embodiments, when there are a plurality of pre-constructed data prediction models, the model trainer 1314 may determine, as the data prediction model to be trained, a data prediction model having the high correlation between input training data and the base training data. In this case, the base training data may be pre-classified according to types of data, and the data prediction model may be pre-constructed according to types of data. For example, the base training data may be pre-classified according to various standards, such as a region where training data is generated, a time at which training data is generated, the size of training data, a genre of training data, a generator of training data, and a type of object in training data.

Furthermore, the model trainer 1314 may train the data prediction model by using a learning algorithm including, for example, error back-propagation or gradient decent.

Furthermore, the model trainer 1314 may train the data prediction model through, for example, supervised learning using the training data as an input value. Additionally, the model trainer 1314 may train the data prediction model through, for example, unsupervised learning in which a type of data required to predict motion information is self-learned without separate supervision and a criterion for predicting the motion information is discovered. Moreover, the model trainer 1314 may train the data prediction model through, for example, reinforcement learning using feedback regarding whether a result of predicting motion information according to learning is correct.

When the data prediction model is trained, the model trainer 1314 may store the trained data prediction model. In this case, the model trainer 1314 may store the trained data prediction model in a memory. In one or more examples, the model trainer 1314 may store the trained data prediction model in a memory of a device including the data predictor 1320 described below. In one or more examples, the model trainer 1314 may store the trained data prediction model in a memory of a server connected to an electronic device through a wired or wireless network.

In one or more examples, the memory storing the trained data prediction model may also store, for example, a command or data related to at least one component of the device. Furthermore, the memory may store software and/or a program. The program may include, for example, a kernel, middleware, an application programming interface (API), and/or an application program (or an application).

The model evaluator 1315 may input evaluation data to the data prediction model, and when a prediction result output from the evaluation data does not meet a predetermined standard, enable the model trainer 1314 to repeat the training. In one or more examples, the evaluation data may be pre-set data for evaluating the data prediction model.

For example, the model evaluator 1315 may evaluate that the predetermined standard is not met when the number or proportion of pieces of evaluation data in which a prediction result is not accurate exceeds a pre-set threshold value from among the prediction results of the trained data prediction model regarding the evaluation data. For example, when the predetermined standard is defined to be a proportion of 2% and the trained data prediction model outputs wrong prediction results regarding more than 20 pieces of evaluation data from among total 1000 pieces of evaluation data, the model evaluator 1315 may evaluate that the trained data prediction model is not suitable.

Furthermore, when there is a plurality of trained data prediction models, the model evaluator 1315 may evaluate whether each trained data prediction model satisfies the predetermined standard, and determine a model satisfying the predetermined standard as a final data prediction model. When a plurality of models satisfy the predetermined standard, the model evaluator 1315 may determine one pre-set model or a certain number of models as the final data prediction model in an order from a high evaluation score.

At least one of the data obtainer 1311, the preprocessor 1312, the training data selector 1313, the model trainer 1314, or the model evaluator 1315 in the data learner 1310 may be manufactured in a form of at least one hardware chip and mounted on an electronic device. For example, at least one of the data obtainer 1311, the preprocessor 1312, the training data selector 1313, the model trainer 1314, or the model evaluator 1315 may be manufactured in a form of a dedicated hardware chip for AI or manufactured as a part of an existing general-purpose processor (for example, a CPU or application processor) or graphic-dedicated processor (for example, a GPU), and mounted on various types of electronic devices described above.

Furthermore, the data obtainer 1311, the preprocessor 1312, the training data selector 1313, the model trainer 1314, and the model evaluator 1315 may be mounted on one electronic device or on individual electronic devices. According to one or more embodiments, the electronic device may include the computing device 1300 or the display device 200. For example, some of the data obtainer 1311, the preprocessor 1312, the training data selector 1313, the model trainer 1314, and the model evaluator 1315 may be included in the display device 200, and the remaining thereof may be included in the computing device 1300. Furthermore, some thereof may be included in the electronic device and the remaining thereof may be included in a server.

In one or more examples, at least one of the data obtainer 1311, the preprocessor 1312, the training data selector 1313, the model trainer 1314, or the model evaluator 1315 may be realized as a software module. When at least one of the data obtainer 1311, the preprocessor 1312, the training data selector 1313, the model trainer 1314, or the model evaluator 1315 is realized as a software module (for a program module including an instruction), the software module may be stored in a non-transitory computer-readable medium. Furthermore, in one or more examples, at least one software module may be provided by an OS or a certain application. In one or more examples, a part of the at least one software module may be provided by the OS and the remaining part may be provided by the certain application.

Figure 15:
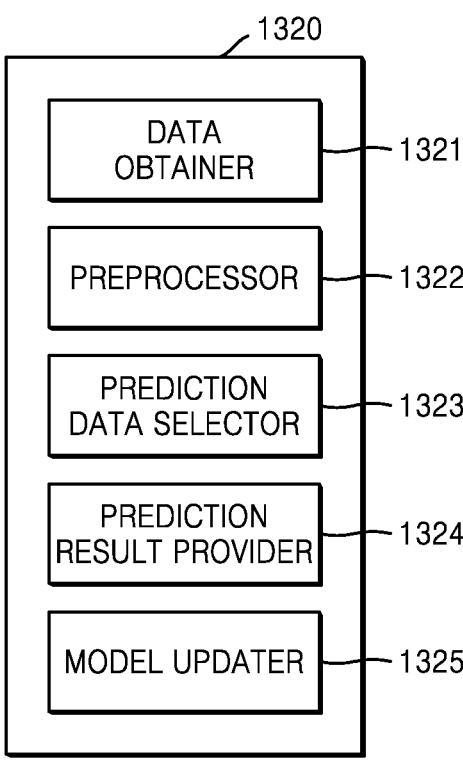
FIG. 15 is a block diagram of a configuration of a data predictor according to an embodiment.

FIG. 15 is a block diagram of a configuration of the data predictor 1320 according to an embodiment.

Referring to FIG. 15, the data predictor 1320 according to some embodiments may include a data obtainer 1321, a preprocessor 1322, a prediction data selector 1323, a prediction result provider 1324, and a model updater 1325.

The data obtainer 1321 may obtain data required to predict motion information from a frame. The preprocessor 1322 may preprocess the obtained data such that the obtained data may be used. The preprocessor 1322 may process the obtained data in a pre-set format such that the prediction result provider 1324 described below may use the obtained data to predict the motion information from the frame.

The prediction data selector 1323 may select data required to predict the motion information from the frame among the preprocessed data. The selected data may be provided to the prediction result provider 1324. The prediction data selector 1323 may select a part or all of the preprocessed data, according to a pre-set criterion for predicting the motion information from the frame.

The prediction result provider 1324 may predict the motion information from the frame by applying the selected data to a data prediction model. The prediction result provider 1324 may provide a prediction result according to a prediction purpose of the data. The prediction result provider 1324 may apply the selected data to the data prediction model by using, as an input value, the data selected by the prediction data selector 1323. Furthermore, the prediction result may be determined by the data prediction model. The prediction result provider 1324 may provide identification information for predicting the motion information from the frame.

The model updater 1325 may update the data prediction model, based on evaluation on the prediction result provided by the prediction result provider 1324. For example, the model updater 1325 may provide the prediction result provided by the prediction result provider 1324 to the model trainer 1314 such that the model trainer 1314 may update the data prediction model.

At least one of the data obtainer 1321, the preprocessor 1322, the prediction data selector 1323, the prediction result provider 1324, or the model updater 1325 in the data predictor 1320 may be manufactured in a form of at least one hardware chip and mounted on an electronic device. For example, at least one of the data obtainer 1321, the preprocessor 1322, the prediction data selector 1323, the prediction result provider 1324, or the model updater 1325 may be manufactured in a form of a dedicated hardware chip for AI or manufactured as a part of an existing general-purpose processor (e.g., a CPU or application processor) or graphic-dedicated processor (e.g., a GPU), and mounted on various types of electronic devices described above.

Furthermore, the data obtainer 1321, the preprocessor 1322, the prediction data selector 1323, the prediction result provider 1324, and the model updater 1325 may be mounted on one electronic device or on individual devices. For example, some of the data obtainer 1321, the preprocessor 1322, the prediction data selector 1323, the prediction result provider 1324, and the model updater 1325 may be included in the electronic device, and the remaining thereof may be included in a server.

At least one of the data obtainer 1321, the preprocessor 1322, the prediction data selector 1323, the prediction result provider 1324, or the model updater 1325 may be realized as a software module. When at least one of the data obtainer 1321, the preprocessor 1322, the prediction data selector 1323, the prediction result provider 1324, or the model updater 1325 is realized as a software module (for a program module including an instruction), the software module may be stored in a non-transitory computer-readable medium. In one or more examples, at least one software module may be provided by an OS or a certain application. In one or more examples, a part of the at least one software module may be provided by the OS and the remaining part may be provided by the certain application.

A computing device and an operation method thereof, according to some embodiments, may also be realized in a form of a recording medium including instructions executable by a computer, such as a program module executed by a computer. A computer-readable medium may be an arbitrary available medium accessible by a computer, and includes all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable instructions, data structures, program modules, and other data. The communication medium typically includes a computer-readable instruction, a data structure, a program module, other data of a modulated data signal, or another transmission mechanism, and an example thereof includes an arbitrary information transmission medium.

Furthermore, in the specification, the term "unit" or "-or/er" may be a hardware component such as a processor or circuit and/or a software component that is executed by a hardware component such as a processor.

A method of improving video quality, according to one or more embodiments of the disclosure described above, may be realized by a computer program product including a recording medium having recorded thereon a computer program for performing the method including obtaining first motion information regarding a user control object from a frame included in a video, obtaining second motion information regarding remaining pixels of pixels included in the frame excluding pixels included in the user control object, by using a first neural network, and generating an interpolation frame between at least two frames from the at least two frames, the first motion information, and the second motion information, by using a second neural network.

The above description is provided for illustration, and it will be understood by one of ordinary skill in the art that various changes in form and details may be readily made therein without departing from essential features and the scope of the disclosure as defined by the following claims. Accordingly, the above embodiments are examples only in all aspects and are not limited. For example, each component described as a single type may be implemented in a distributed manner, and similarly, components described as distributed may be implemented in a combined form.

What is claimed is:

1. A method performed by an apparatus for improving video quality, the method comprising:
   obtaining first motion information for a user control object displayed in a first frame of a video, from a mapping table pre-generated and stored in the apparatus;
   obtaining by using a first neural network, second motion information that is a prediction of motion information of a first set of pixels included in the first frame of the video excluding the user control object; and
   generating, by using a second neural network, an interpolation frame between the first frame and a second frame included in the video, based on the first frame, the second frame, the first motion information and the second motion information,
   wherein the mapping table is generated based on a correlation between motion information of pixels included in the user control object and a user input.

2. The method of claim 1, further comprising post processing the first motion information and the second motion information,
   wherein the post processing comprises at least one of:
   modifying motion information of a certain pixel included in a plurality of pixels by using motion information of at least one adjacent pixel adjacent to the certain pixel; or
   obtaining motion information per object by grouping the pixels included in a frame per object.

3. The method of claim 1, further comprising:
   receiving a third frame before the obtaining the first motion information; and
   generating the mapping table based on the user input regarding the user control object included in the third frame.

4. The method of claim 3, wherein the generating the mapping table comprises:
   obtaining motion information regarding all pixels included in the third frame by using the first neural network;
   detecting at least one object from the third frame by using a third neural network;
   identifying the user control object controlled according to the user input from the detected at least one object; and
   generating the mapping table based on a correlation between the motion information of the pixels included in the user control object included in the third frame and the user input regarding the user control object included in the third frame.

5. The method of claim 4, further comprising modifying motion information of pixels included in the detected at least one object, based on an event regarding the detected at least one object,
   wherein the event comprises at least one of zoom-in, zoom-out, or rotation.

6. The method of claim 4, wherein the detecting the at least one object comprises detecting whether the at least one object is a foreground object or a background object.

7. The method of claim 4, wherein the generating the mapping table comprises:
   receiving the user input during a predetermined period of time; and
   updating the mapping table based on the user input during the predetermined period of time.

8. The method of claim 4, wherein the generating of the mapping table comprises:

obtaining a parameter change value of a parameter of a controller according to the user input; and mapping the motion information of the pixels included in the user control object according to the parameter change value of the controller, wherein the parameter of the controller comprises at least one of a moving direction, a moving distance, a moving time, a moving speed, a moving acceleration, a moving strength, or a moving amplitude.

9. The method of claim 8, wherein the generating of the mapping table comprises generating the mapping table for each type of the controller that receives the user input.

10. The method of claim 1, further comprising obtaining the first motion information from metadata included in the video.

11. An apparatus for improving video quality, the apparatus comprising:

a memory storing one or more instructions; and a processor configured to execute the one or more instructions stored in the memory to:

obtain first motion information for a user control object displayed in a first frame of a video from a mapping table pre-generated and stored in the apparatus;

obtain by using a first neural network, second motion information that is a prediction of motion information of a first set of pixels included in the first frame of the video excluding the user control object; and generate, by using a second neural network, an interpolation frame between the first frame and a second frame included in the video, based on the first frame, the second frame, the first motion information and the second motion information, wherein the mapping table is generated based on a correlation between motion information of pixels included in the user control object and a user input.

12. The apparatus of claim 11, wherein the processor is further configured to execute the one or more instructions to post process the first motion information and the second motion information, wherein the post process comprises at least one of modifying motion information of a certain pixel included in the plurality of pixels by using motion information of at least one adjacent pixel adjacent to the certain pixel, or obtaining motion information per object by grouping pixels included in a frame per object.

13. The apparatus of claim 11, wherein the processor is further configured to execute the one or more instructions to:

receive a third frame before obtaining the first motion information; and generate the mapping table based on the user input regarding the user control object included in the third frame.

14. The apparatus of claim 13, wherein the processor is further configured to execute the one or more instructions to:

obtain motion information regarding all pixels included in the third frame by using the first neural network;

detect at least one object from the third frame by using a third neural network;

identify the user control object controlled according to a user input from the detected at least one object; and generate the mapping table based on a correlation between the motion information of the pixels included in the user control object included in the third frame and the user input regarding the user control object included in the third frame.

15. The apparatus of claim 14, wherein the processor is further configured to execute the one or more instructions to:

modify motion information of pixels included in the detected at least one object, based on an event regarding the detected at least one object, wherein the event comprises at least one of zoom-in, zoom-out, or rotation.

16. The apparatus of claim 14, wherein the processor is further configured to execute the one or more instructions to:

detect whether the at least one object is a foreground object or a background object.

17. The apparatus of claim 14, wherein the processor is further configured to execute the one or more instructions to:

receive the user input during a predetermined period of time; and update the mapping table based on the user input during the predetermined period of time.

18. The apparatus of claim 14, wherein the processor is further configured to execute the one or more instructions to:

obtain a parameter change value of a parameter of a controller according to the user input; and map the motion information of the pixels included in the user control object according to the parameter change value of the controller, wherein the parameter of the controller comprises at least one of a moving direction, a moving distance, a moving time, a moving speed, a moving acceleration, a moving strength, or a moving amplitude.

19. The apparatus of claim 18, wherein the processor is further configured to execute the one or more instructions to: generate the mapping table for each type of the controller that receives the user input.

20. A non-transitory computer-readable recording medium having instructions stored therein, which when executed by a processor cause the processor to execute a method of improving video quality, the method comprises:

obtaining first motion information for a user control object displayed in a first frame of a video, from a mapping re-generated and stored in an apparatus;

obtaining by using a first neural network, second motion information that is a prediction of motion information of a first set of pixels included in the first frame of the video excluding the user control object; and generating, by using a second neural network, an interpolation frame between the first frame and a second frame included in the video, based on the first frame, the second frame, the first motion information and the second motion information, wherein the mapping table is generated based on a correlation between motion information of pixels included in the user control object and a user input.

* * * * *